United States Patent
Zhang

(10) Patent No.: US 11,183,872 B2
(45) Date of Patent: *Nov. 23, 2021

(54) SYSTEM AND METHOD FOR GROUP CONTROL OF DISTRIBUTED ENERGY STORAGE DEVICES

(71) Applicant: WÄRTSILÄ NORTH AMERICA, INC., Herndon, VA (US)

(72) Inventor: Sen Zhang, Vienna, VA (US)

(73) Assignee: WÄRTSILÄ NORTH AMERICA, INC., Herndon, VA (US)

(*) Notice: Subject to any disclaimer, the term of this patent is extended or adjusted under 35 U.S.C. 154(b) by 39 days.

This patent is subject to a terminal disclaimer.

(21) Appl. No.: 16/713,539

(22) Filed: Dec. 13, 2019

(65) Prior Publication Data

US 2020/0119584 A1    Apr. 16, 2020

Related U.S. Application Data

(63) Continuation of application No. 14/054,999, filed on Oct. 16, 2013, now Pat. No. 10,516,295.

(Continued)

(51) Int. Cl.
*H02J 13/00* (2006.01)
*H02J 3/46* (2006.01)
*H02J 3/38* (2006.01)

(52) U.S. Cl.
CPC ............ *H02J 13/00* (2013.01); *H02J 3/382* (2013.01); *H02J 13/00002* (2020.01);
(Continued)

(58) Field of Classification Search
CPC ............... H02J 13/00; H02J 13/00001; H02J 13/00002; H02J 13/00004; H02J 13/0079; H02J 13/00028; H02J 3/381; H02J 3/382; H02J 3/46; H02J 3/466; H02J 2300/20; H02J 2300/22; H02J 2300/28;
(Continued)

(56) References Cited

U.S. PATENT DOCUMENTS 5,949,218 A    9/1999  Colles et al.
6,239,997 B1   5/2001  Deng
(Continued)

FOREIGN PATENT DOCUMENTS

| JP | 2005102364 A | 4/2005 |
|---|---|---|
| WO | 2009012399 A2 | 1/2009 |
| WO | 2011089882 A1 | 7/2011 |

OTHER PUBLICATIONS

"'A DNP3 Protocol Primer,' Revision A, DNP Users Group, Mar. 20, 2005."

*Primary Examiner* — M. N. Von Buhr
(74) *Attorney, Agent, or Firm* — Buchanan Ingersoll & Rooney PC

(57) ABSTRACT

Computer software and a system are disclosed to provide group control and network operations to/for a multiplicity of distributed energy storage units. The group control software and system can connect multiple individual distributed energy storage units and operate those units in synchronicity to create a large virtual energy storage device. Methods of controlling the distributed energy storage units include: a browser-based online user portal, or network-based, system-to-system protocols by third-party operation controllers.

20 Claims, 23 Drawing Sheets

Related U.S. Application Data

(60) Provisional application No. 61/714,470, filed on Oct. 16, 2012.

(52) U.S. Cl.
CPC .... *H02J 13/00004* (2020.01); *H02J 13/0079* (2013.01); *H02J 3/46* (2013.01); *H02J 3/466* (2020.01); *H02J 13/00001* (2020.01); *H02J 2300/20* (2020.01); *H02J 2300/22* (2020.01); *H02J 2300/28* (2020.01); *Y02B 70/30* (2013.01); *Y02E 40/70* (2013.01); *Y02E 60/00* (2013.01); *Y04S 10/123* (2013.01); *Y04S 20/221* (2013.01); *Y04S 40/128* (2013.01)

(58) Field of Classification Search
CPC ..... Y02B 70/30; Y02B 70/3225; Y02E 40/70; Y02E 60/00; Y02E 60/7869; Y04S 40/128; Y04S 10/123; Y04S 20/221; Y04S 20/222
See application file for complete search history.

(56) References Cited

U.S. PATENT DOCUMENTS

| | | |
|---|---|---|
| 7,262,694 B2 | 8/2007 | Olsen et al. |
| 7,838,142 B2 | 11/2010 | Scheucher |
| 7,929,327 B2 | 4/2011 | Haines et al. |
| 7,930,070 B2 | 4/2011 | Imes |
| 8,222,765 B2 | 7/2012 | Collins et al. |
| 8,320,146 B2 | 11/2012 | Haines et al. |
| 8,364,609 B2 | 1/2013 | Ozog |
| 8,682,495 B2 | 3/2014 | Carralero et al. |
| 10,516,295 B2 * | 12/2019 | Zhang ................ H02J 13/0079 |
| 2002/0084655 A1 | 7/2002 | Lof et al. |
| 2004/0262996 A1 | 12/2004 | Olsen et al. |
| 2004/0263116 A1 | 12/2004 | Doruk et al. |
| 2005/0280528 A1 | 12/2005 | Olsen et al. |
| 2005/0281064 A1 | 12/2005 | Olsen et al. |
| 2007/0005195 A1 | 1/2007 | Pasquale et al. |
| 2008/0053716 A1 | 3/2008 | Scheucher |
| 2008/0224541 A1 | 9/2008 | Fukuhara |
| 2009/0062969 A1 | 3/2009 | Chandra et al. |
| 2009/0093916 A1 | 4/2009 | Parsonnet et al. |
| 2009/0189456 A1 | 7/2009 | Skutt |
| 2009/0326726 A1 | 12/2009 | Ippolito et al. |
| 2010/0217453 A1 | 8/2010 | Itoh et al. |
| 2010/0225305 A1 | 9/2010 | Reineccius |
| 2010/0244775 A1 | 9/2010 | Smith |
| 2010/0327800 A1 | 12/2010 | Reineccius |
| 2011/0118862 A1 | 5/2011 | Boss et al. |
| 2011/0118894 A1 | 5/2011 | Reineccius et al. |
| 2011/0172837 A1 | 7/2011 | Forbes |
| 2011/0215640 A1 | 9/2011 | Donnelly et al. |
| 2012/0059527 A1 | 3/2012 | Beaston et al. |
| 2012/0089261 A1 | 4/2012 | Kim |
| 2012/0146587 A1 | 6/2012 | Srinivasan et al. |
| 2012/0197449 A1 | 8/2012 | Sanders |
| 2012/0215725 A1 | 8/2012 | Imes et al. |
| 2012/0227926 A1 | 9/2012 | Field et al. |
| 2012/0232709 A1 | 9/2012 | Robinett, III et al. |
| 2012/0242148 A1 | 9/2012 | Galati |
| 2012/0271475 A1 | 10/2012 | Wang et al. |
| 2012/0281444 A1 | 11/2012 | Dent |
| 2012/0324119 A1 | 12/2012 | Imes et al. |
| 2013/0026971 A1 | 1/2013 | Luke et al. |
| 2013/0030588 A1 | 1/2013 | Smith et al. |
| 2013/0035801 A1 | 2/2013 | Xu |
| 2013/0046413 A1 | 2/2013 | Ellis |
| 2013/0141075 A1 | 6/2013 | Erhart et al. |
| 2013/0141142 A1 | 6/2013 | Smith et al. |
| 2014/0015469 A1 | 1/2014 | Beaston et al. |
| 2015/0188482 A1 | 7/2015 | Berkowitz et al. |

* cited by examiner

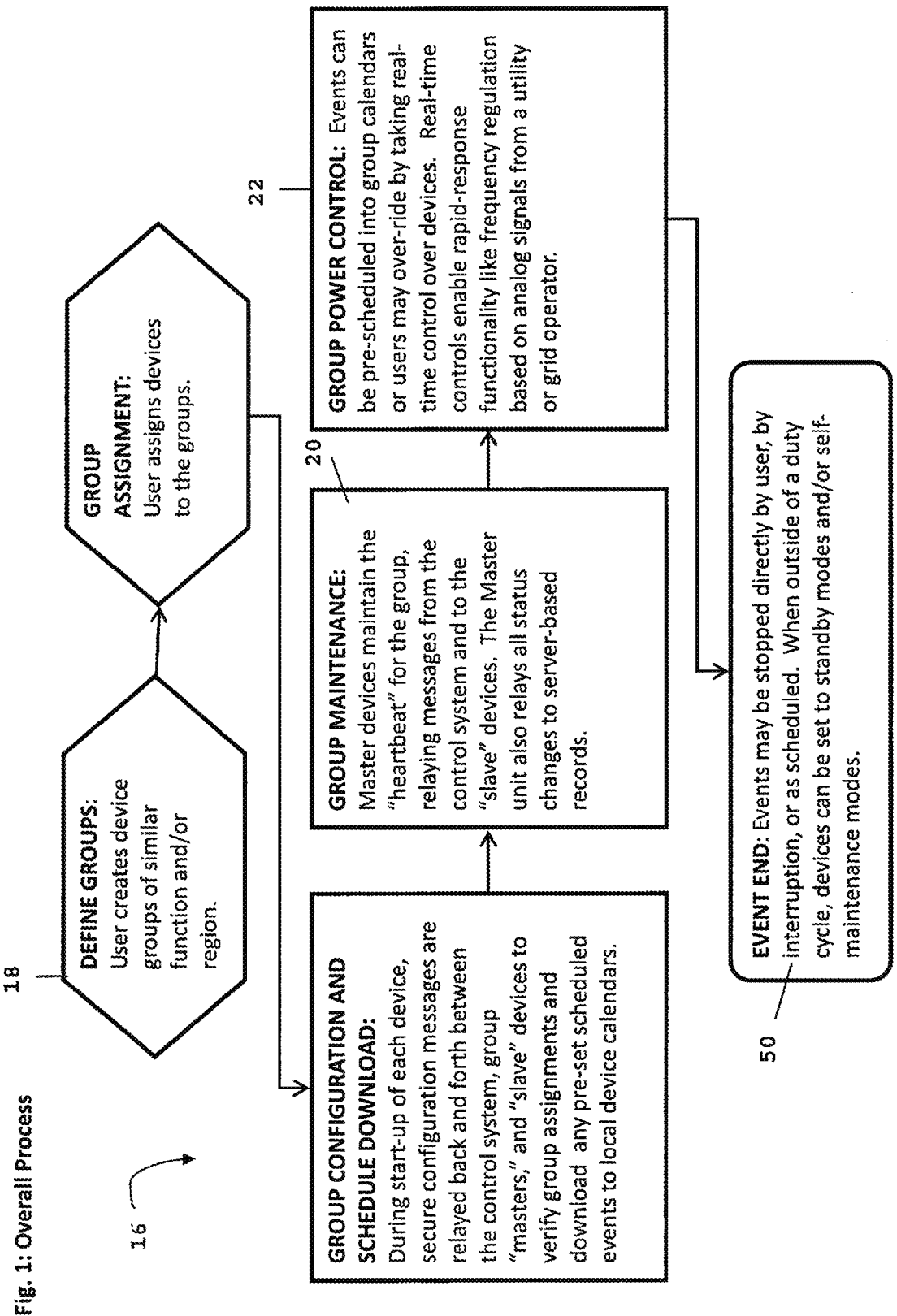
Fig. 1: Overall Process

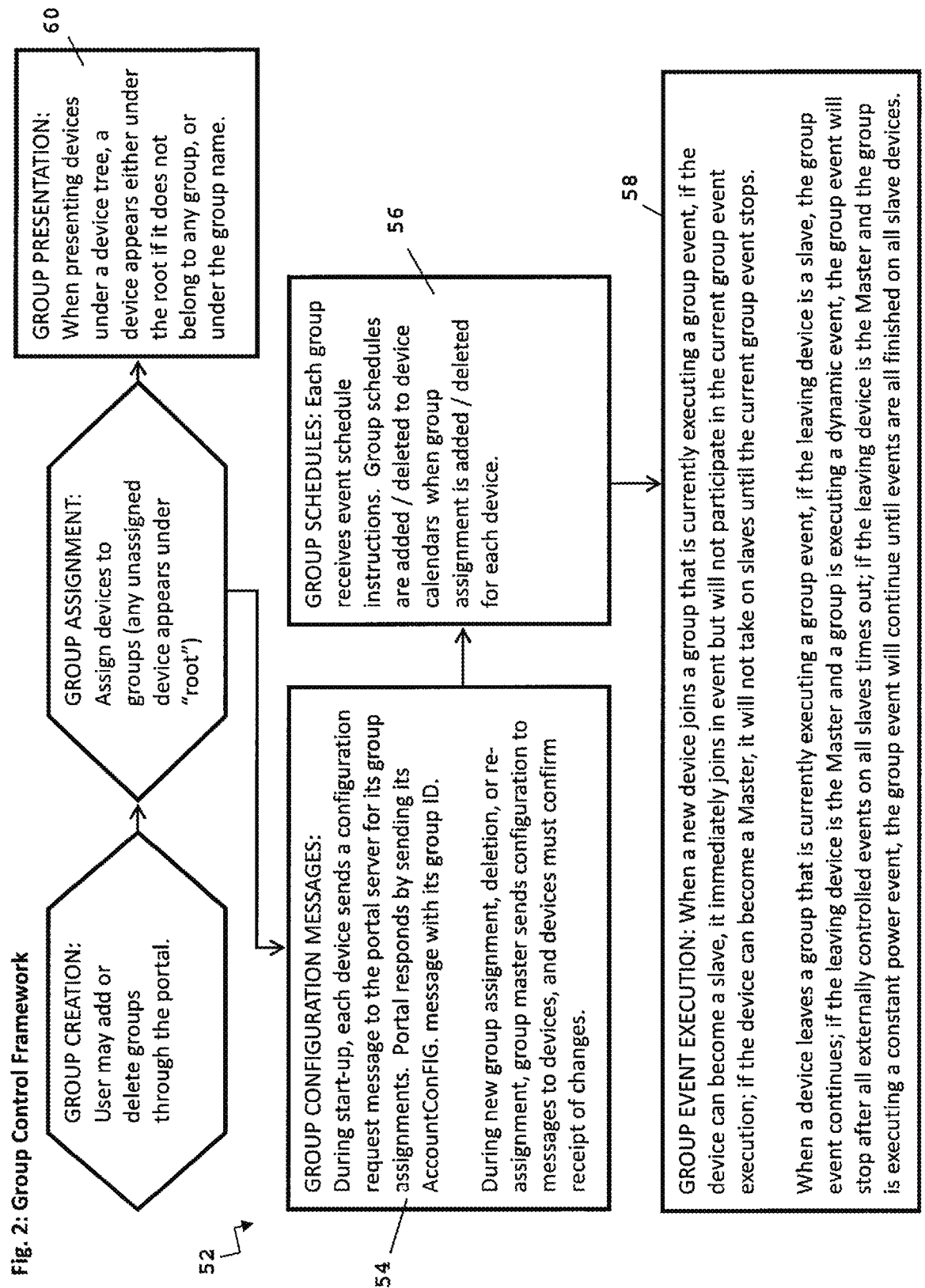
Fig. 2: Group Control Framework

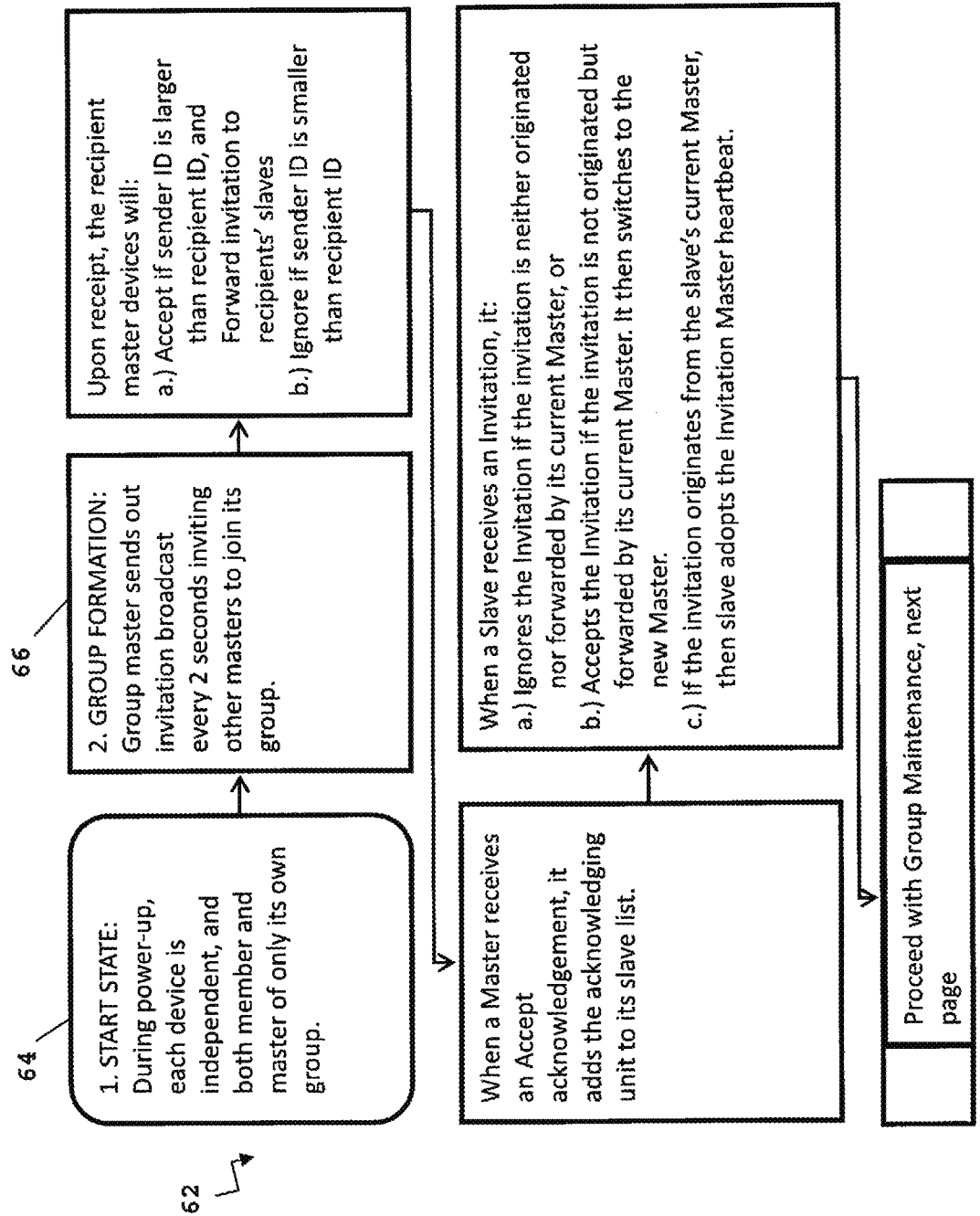

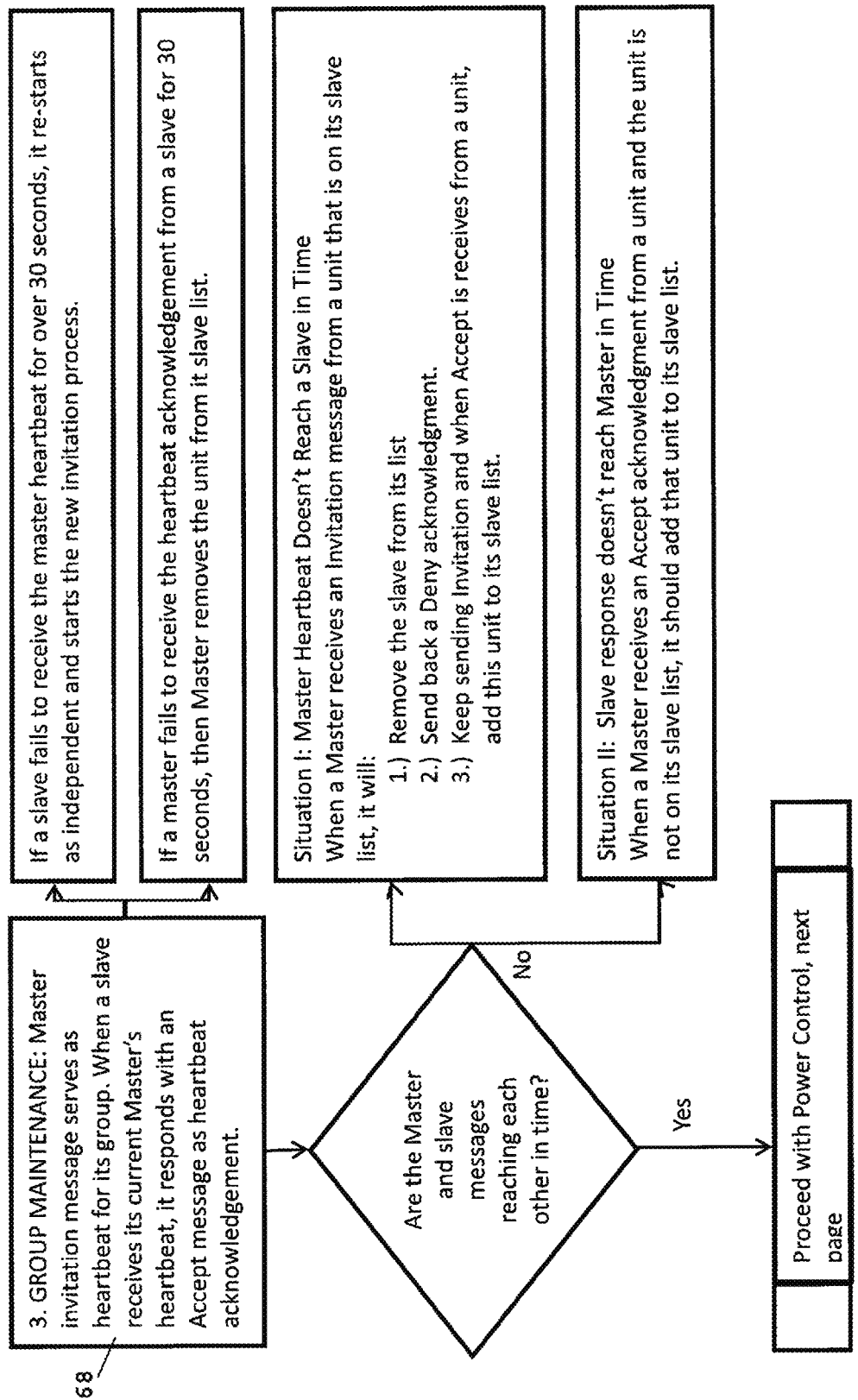
Fig. 3B: Master Election Algorithm (2 pages)

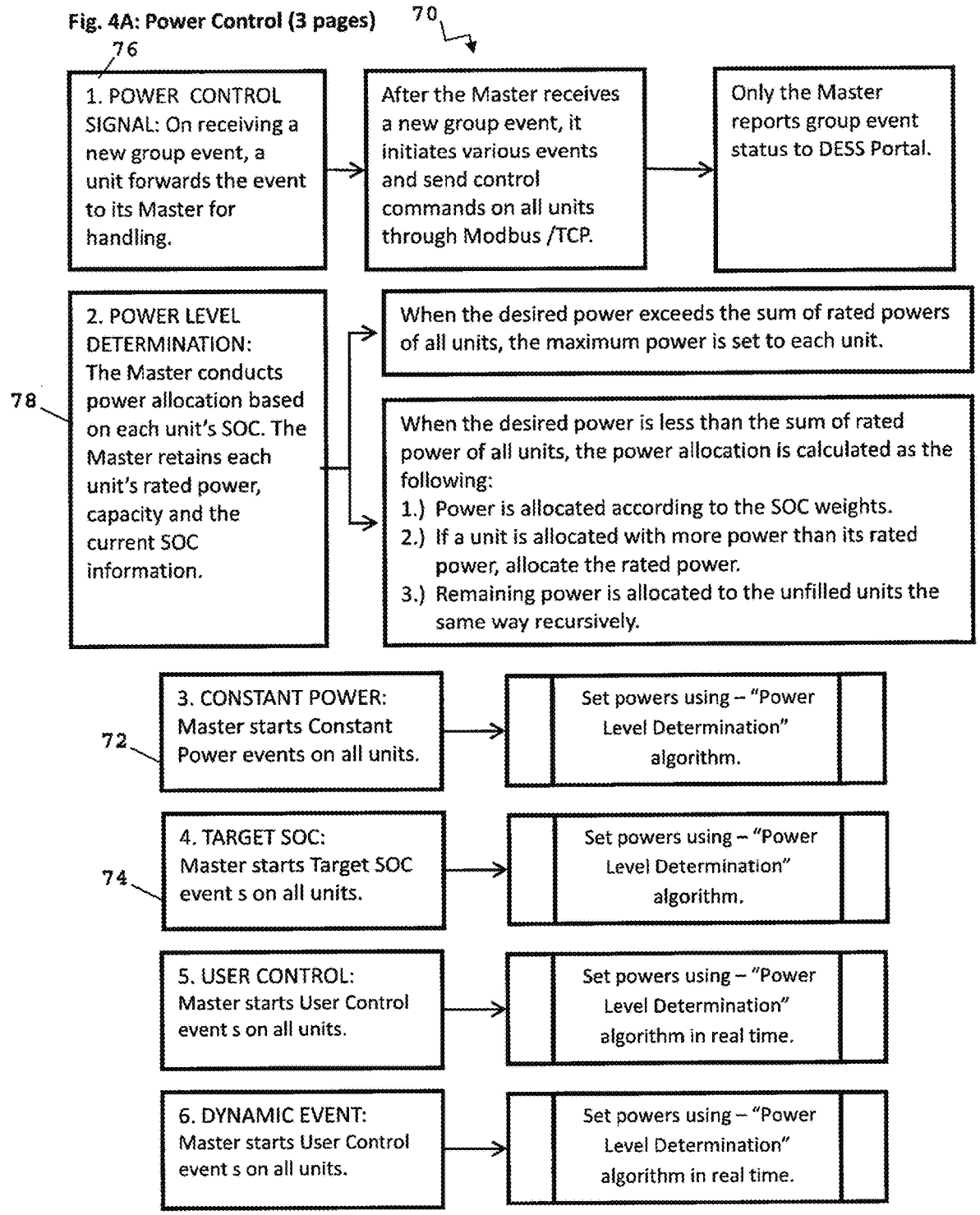

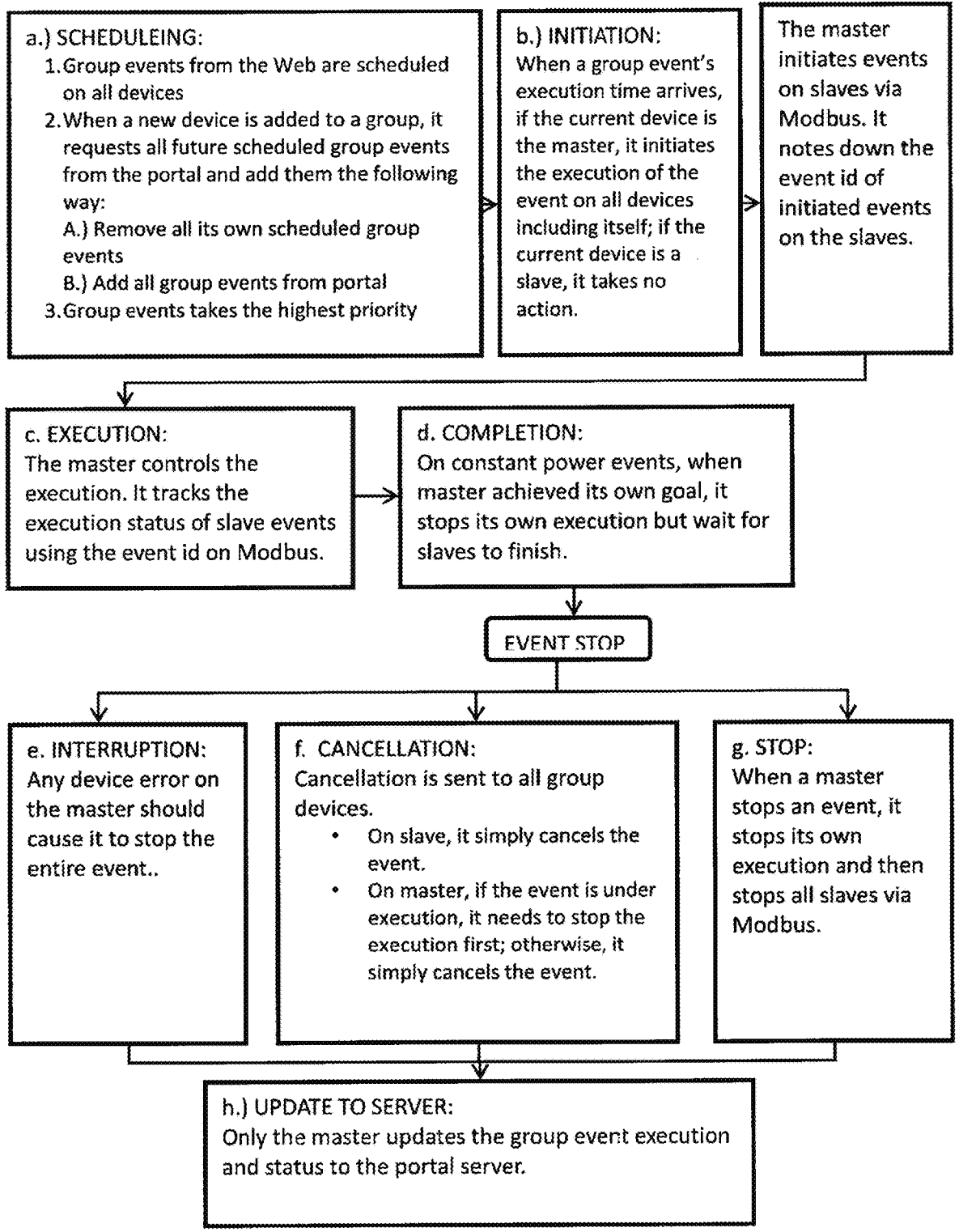

Fig. 4C: Power Control (3 pages)
8. MODBUS EVENT HANDLING
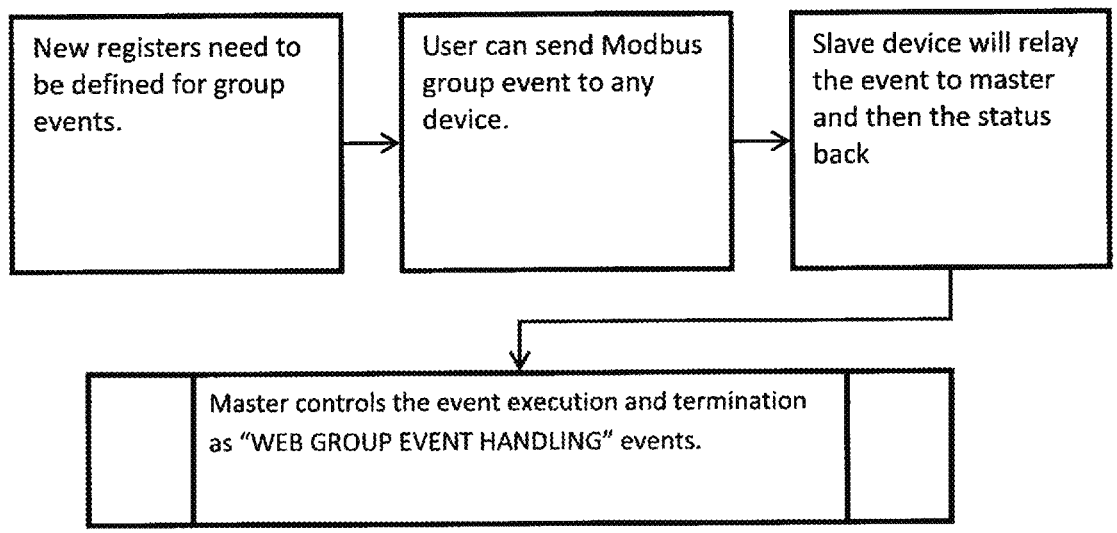

Fig. 5: Login Page
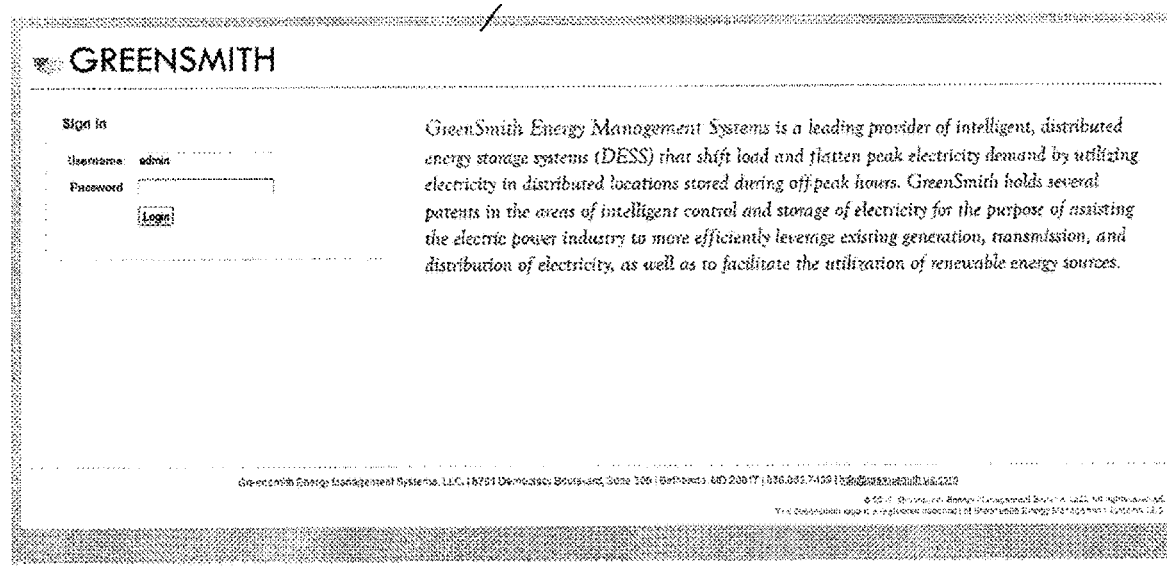
Fig. 6: Landing Page
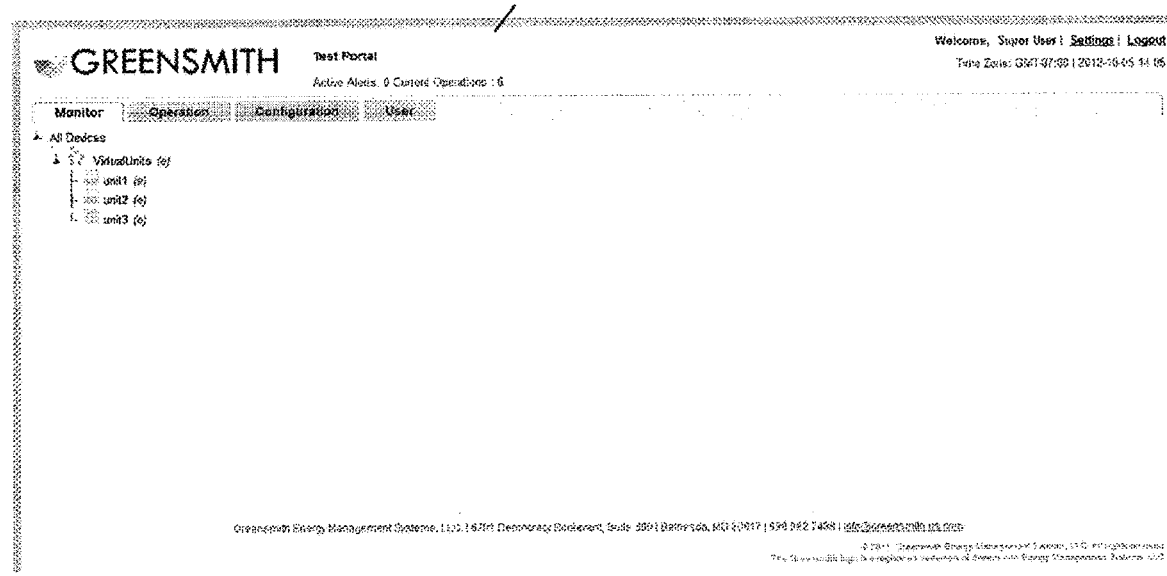

Fig. 7: Add Device Page

Fig. 8: Add Location Page

Fig. 9: Add Group Page

Fig. 10: Group Summary Page

Fig. 11: Add User Page

Fig. 12: User Summary Page

Fig. 13: Group Monitor Dashboard
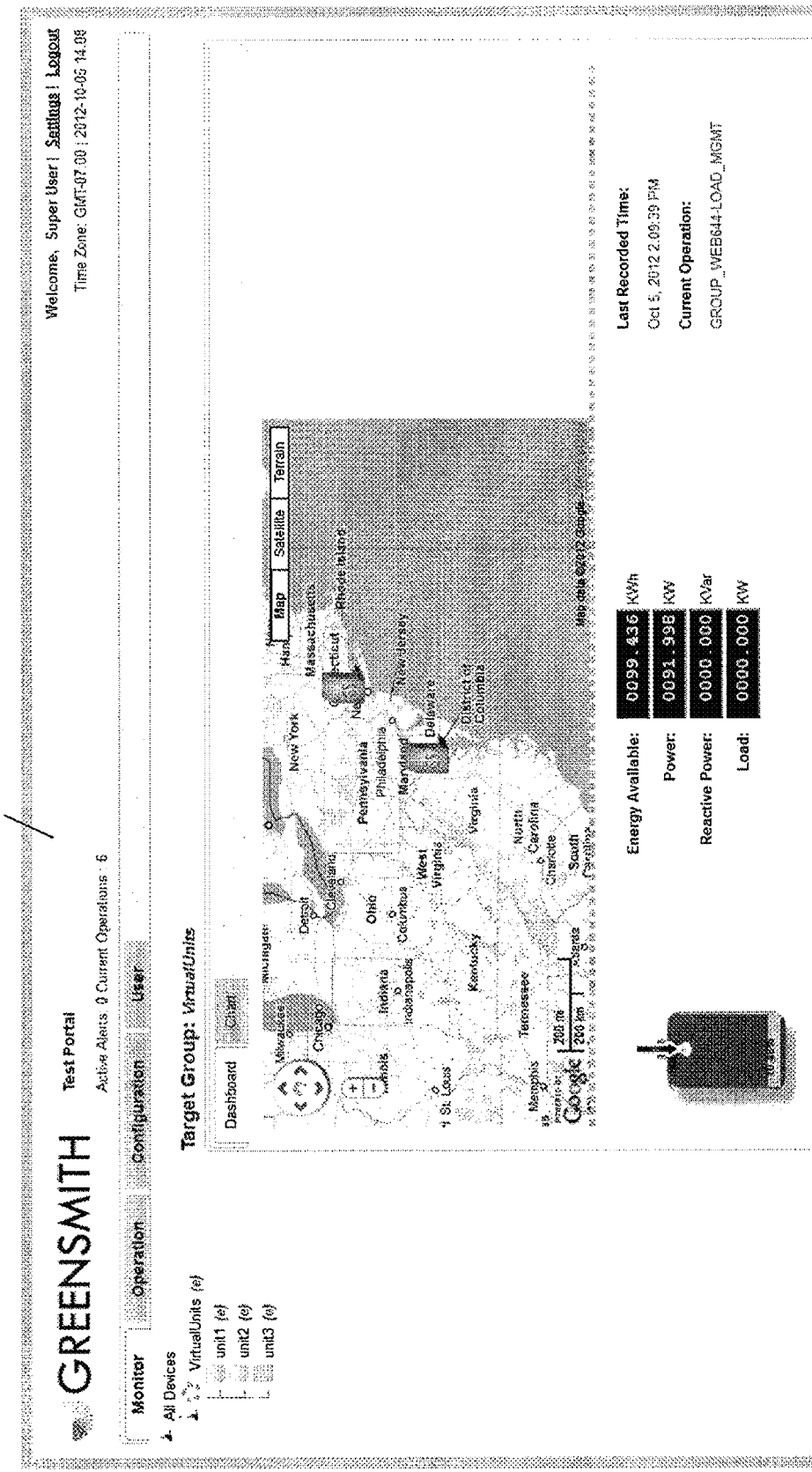

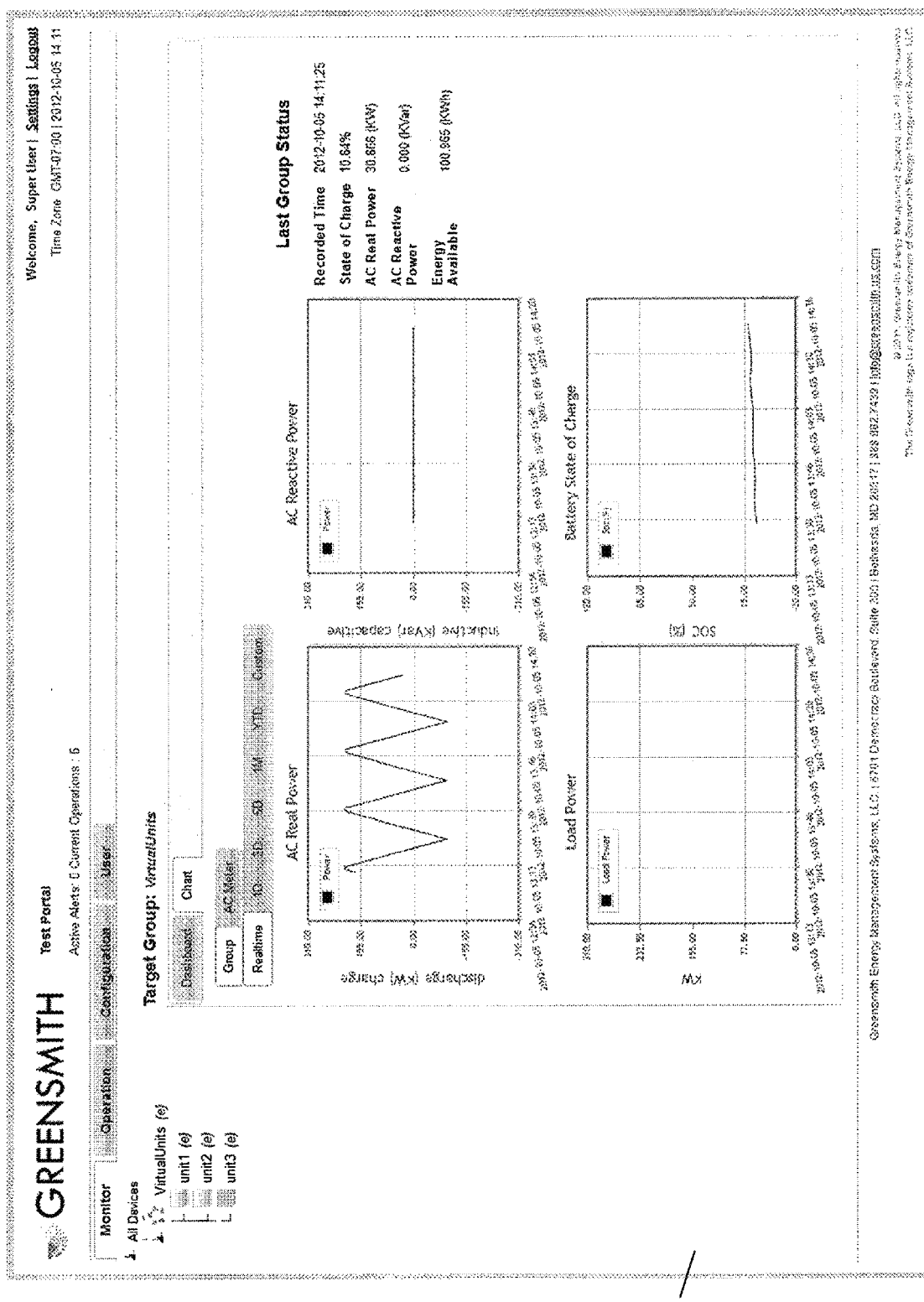
Fig. 14: Group Monitor Chart

Fig. 15: Device Level Monitoring Charts
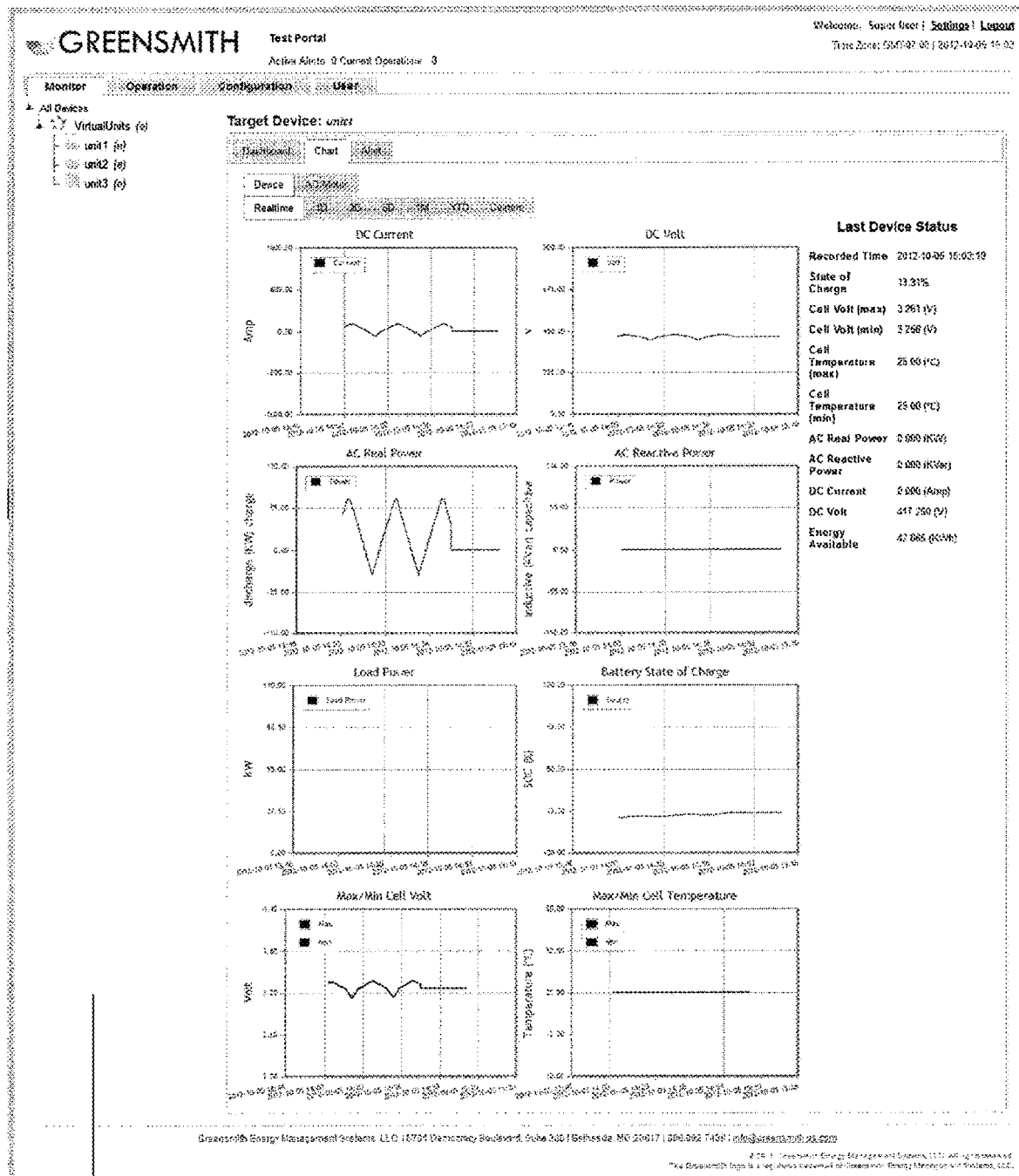

Fig. 16: Download Page
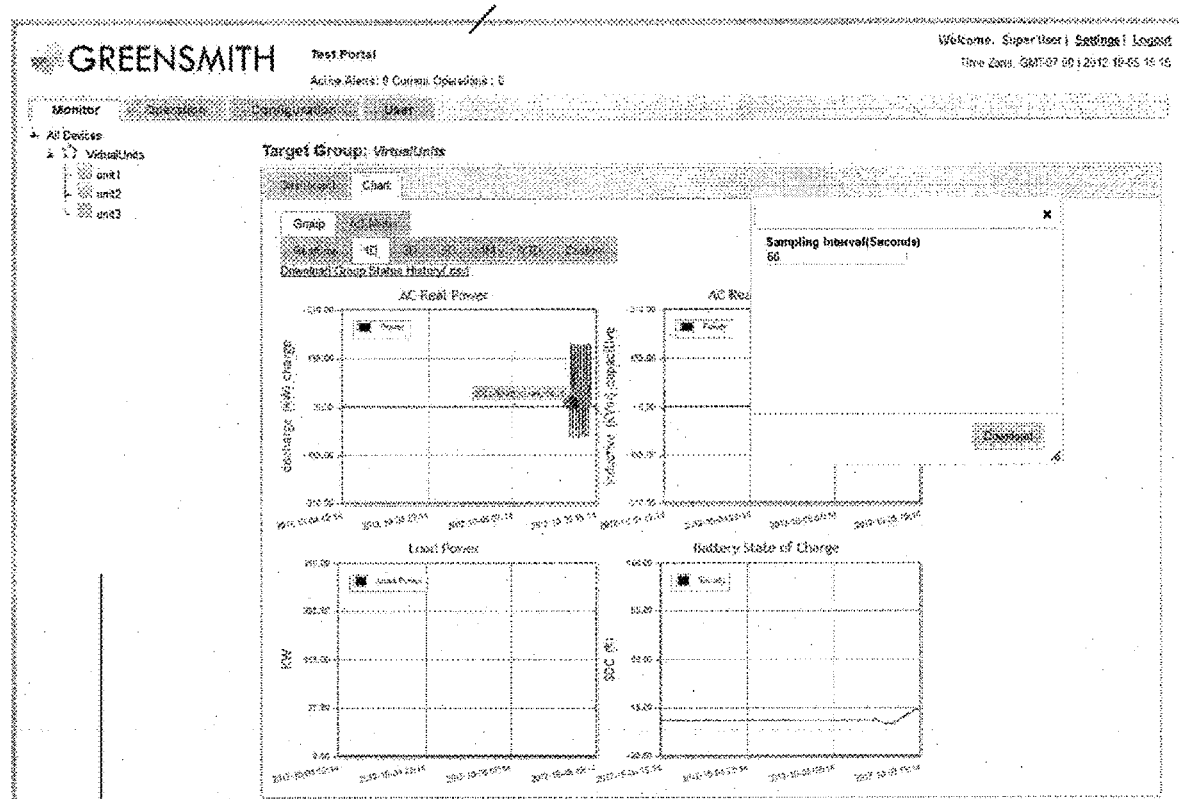

Fig. 17: AC Meter Monitoring Chart    96
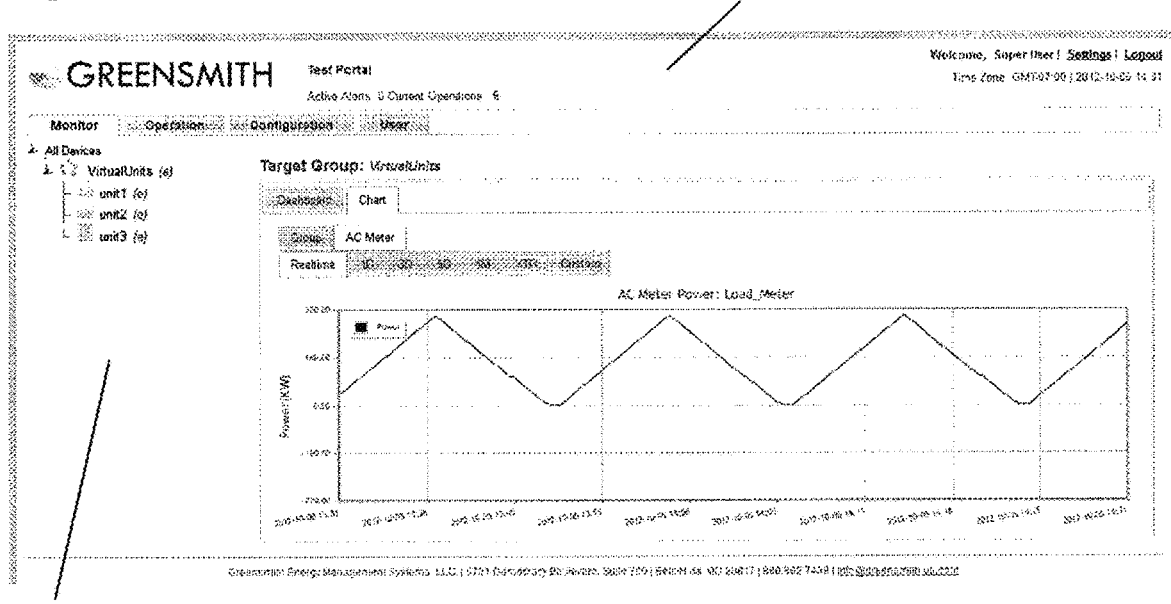
94
Fig. 18: Group Operation Landing Page    98    102
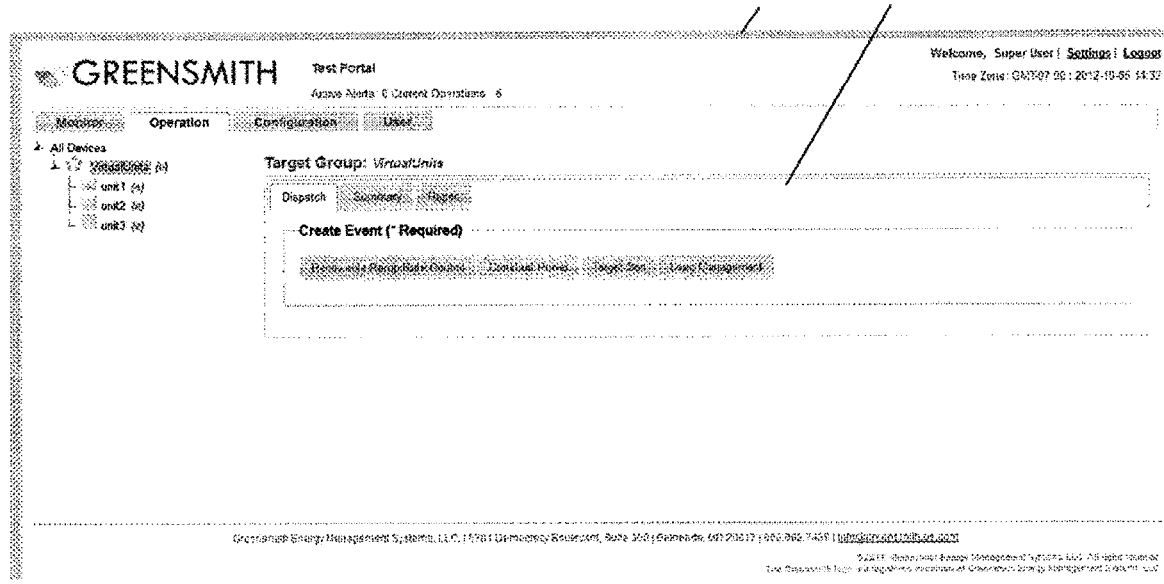

Fig. 19: Renewable Ramp Group Control Event 104

Fig. 20: Constant Power Group Control Event   106
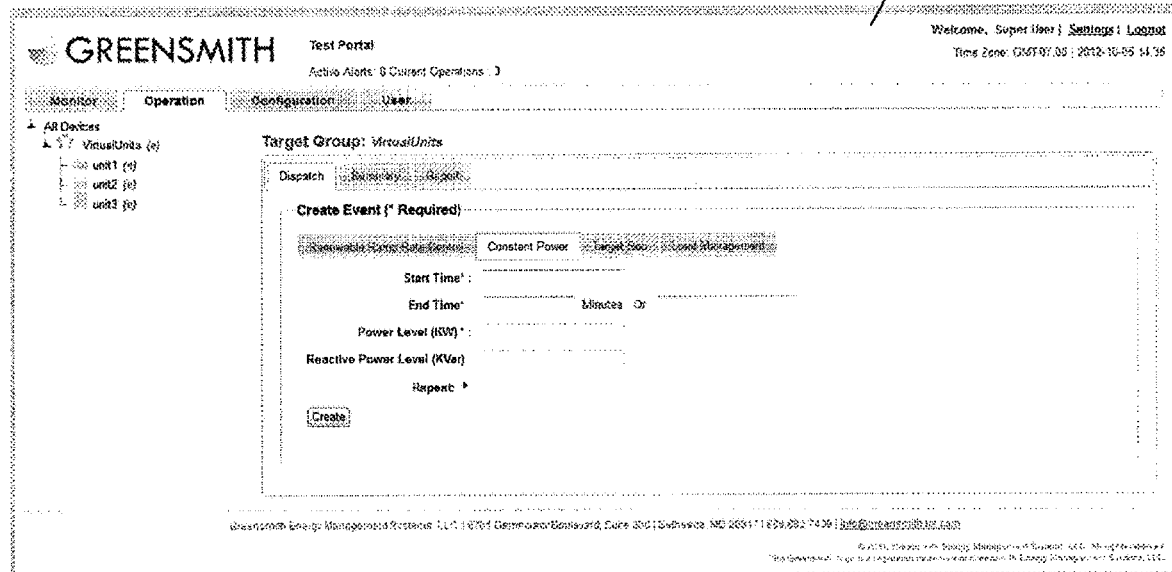
Fig. 21: Target State of Charge Group Control Event   108
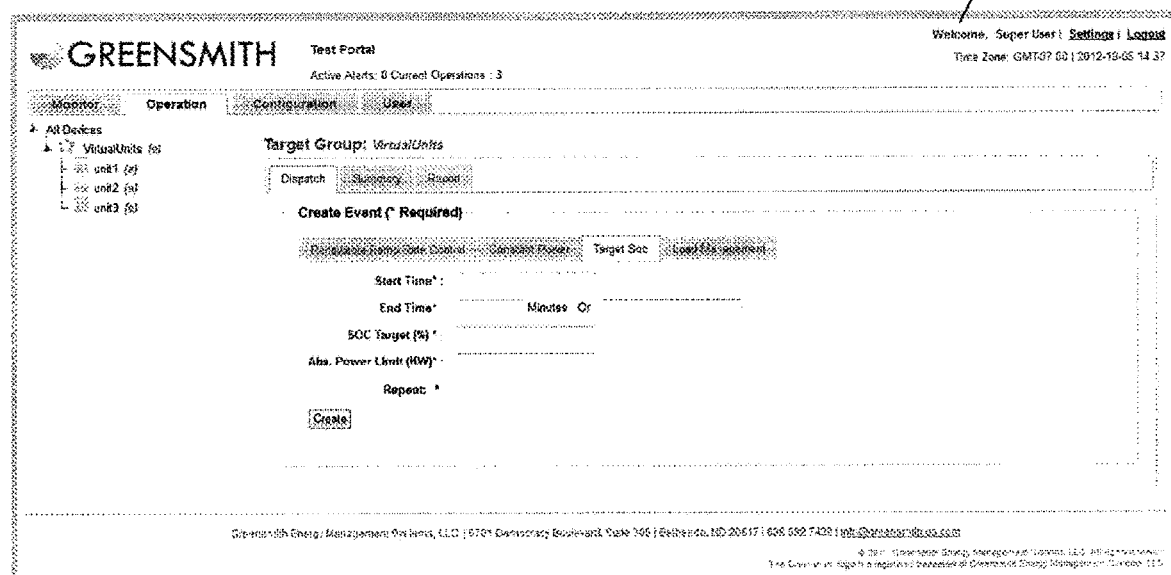

Fig. 22: Load Management Group Control Event 110
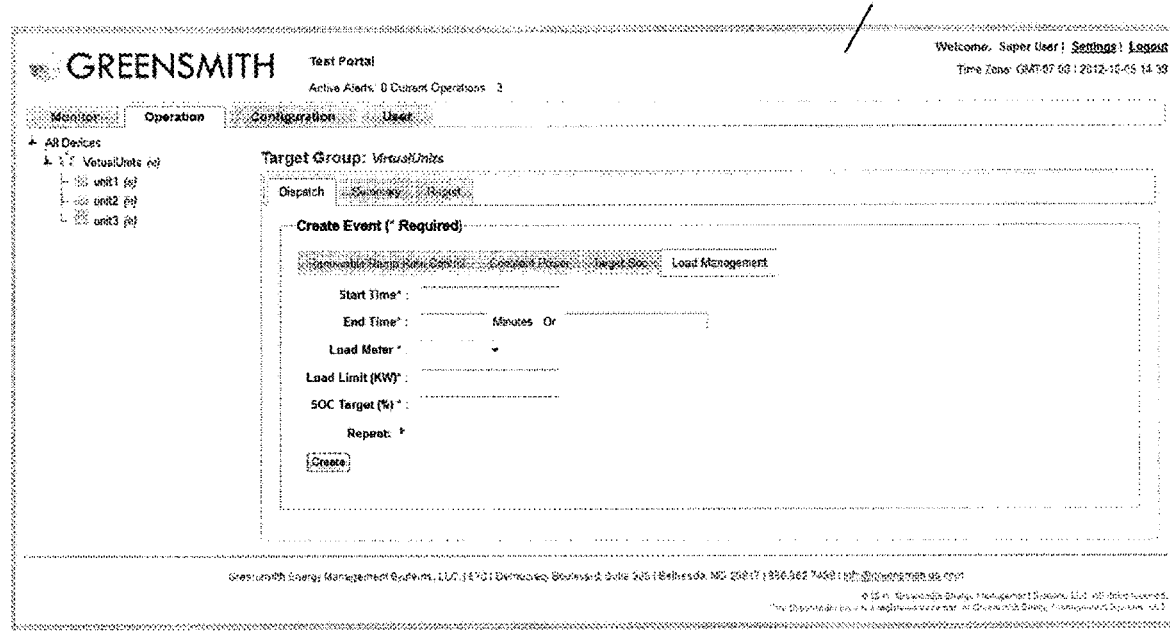

Fig. 23: Group Operation Summary Page

Fig. 24: Group Operation Report Page 114
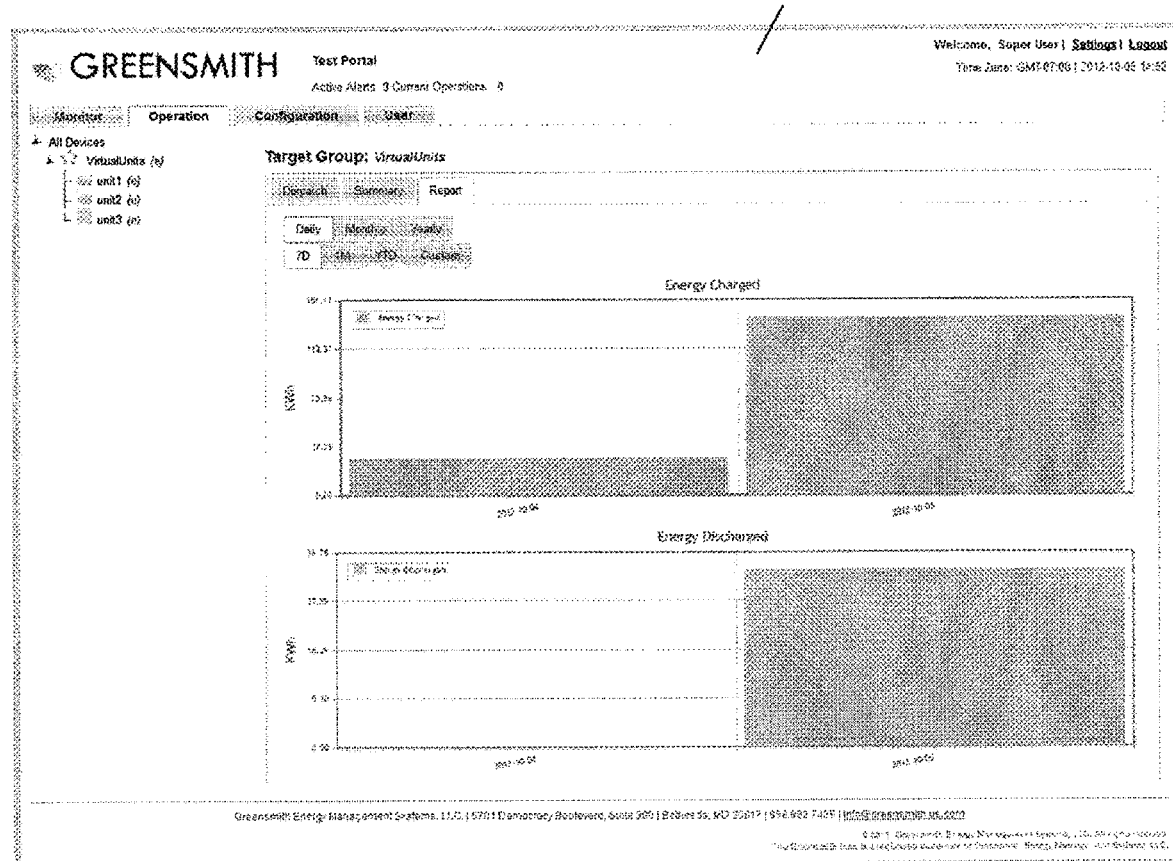

Fig. 25: Settings Page

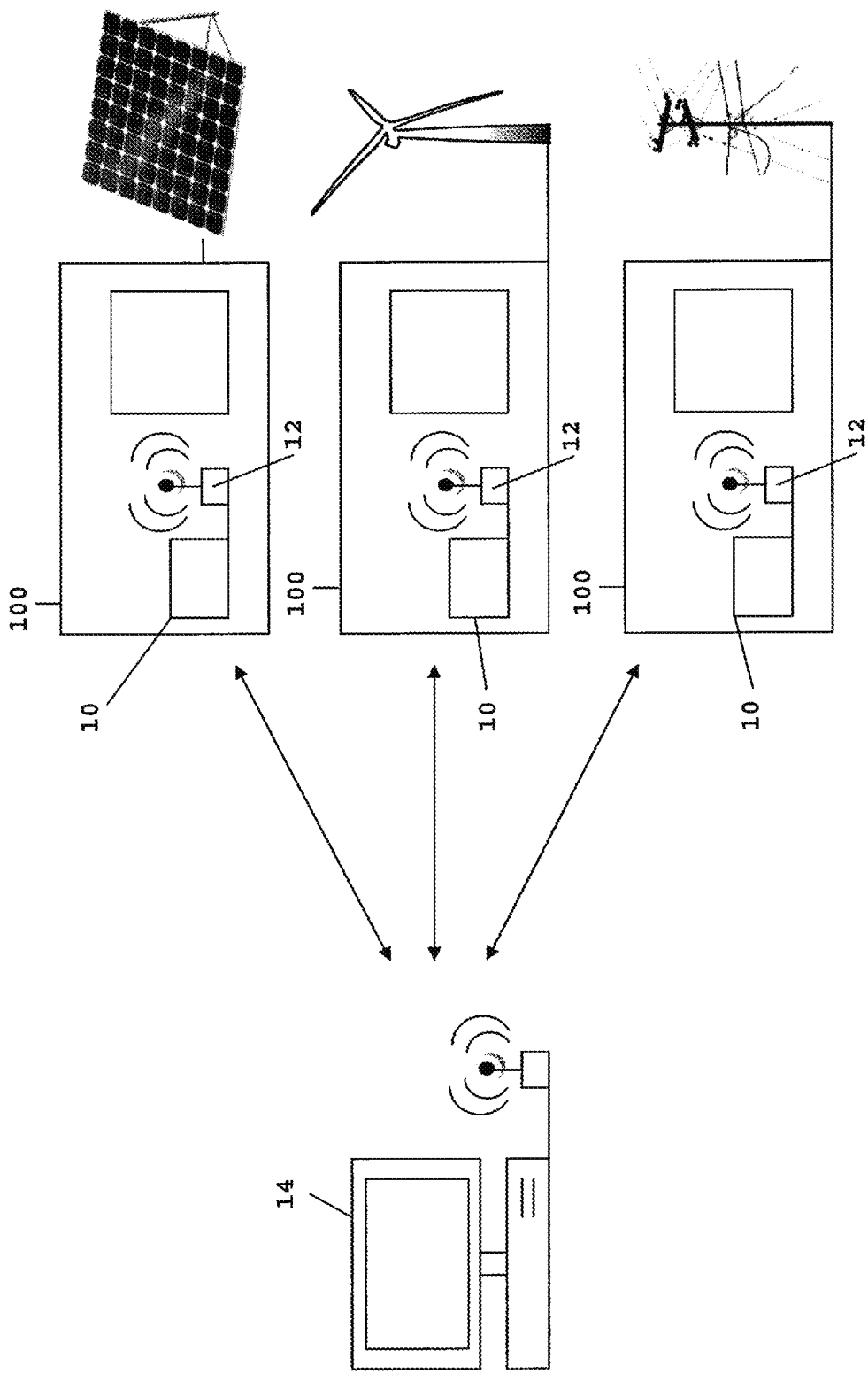
Figure 26: Embodiment of Master / Slave Group Control System

SYSTEM AND METHOD FOR GROUP CONTROL OF DISTRIBUTED ENERGY STORAGE DEVICES

REFERENCE TO RELATED APPLICATIONS

In accordance with 37 C.F.R 1.76, a claim of priority is included in an Application Data Sheet filed concurrently herewith. Accordingly, the present invention claims priority under 35 U.S.C. § 119(e) to U.S. Patent Application 61/714,470 entitled "SYSTEM AND METHOD FOR GROUP CONTROL OF DISTRIBUTED ENERGY STORAGE DEVICES" filed on Oct. 16, 2012, the contents of which is herein incorporated by reference in its entirety. This application is related to U.S. patent application Ser. No. 13/127,967 (now abandoned), entitled "Distributed Energy Storage System, and Applications Thereof", the contents of which are incorporated herein by reference.

FIELD OF THE INVENTION

The present invention generally relates to energy management. More particularly, the present invention relates to a method and system for providing group control of multiple distributed energy storage systems.

BACKGROUND OF THE INVENTION

Electricity and the power networks used to transmit and distribute it are vital. However, ageing infrastructure, increasing demand, and an increase in intermittent power generation resources have caused a need for more flexible power resources on the grid network. In particular, utilities and end-users have begun to adopt distributed energy storage units to alleviate these grid stresses and ensure higher power quality and service levels. These energy storage units, located at transmission and distribution substations, as well as "behind the meter" at customer sites, can be harnessed by utilities, grid operators, and customers to make optimal use of existing and new infrastructure resources. Such resources may be connected to traditional or alternative sources of power generation including, but not limited to, solar or wind farms.

BRIEF SUMMARY OF THE INVENTION

The present invention provides a software and system to provide group control and network operations to/for a multiplicity of distributed energy storage units. In particular, the group control software and system connects multiple individual distributed energy storage units and operates those units in synchronicity to create a large virtual energy storage device. This group control system includes two methods of controlling the distributed energy storage units: through a browser-based online user portal, or though network-based, system-to-system protocols by third-party operation controllers.

BRIEF DESCRIPTION OF THE DRAWINGS AND FIGURES

FIG. 1 illustrates the overall process of the software framework for the group control system for distributed energy storage devices;

FIG. 2 illustrates the group control framework which provides the method of group control within a group control system for distributed energy storage management;

FIG. 3A illustrates a portion of the master election algorithm utilized at system start up for group formation and maintenance;

FIG. 3B illustrates the remainder of the master election algorithm utilized at system start up for group formation and maintenance;

FIG. 4A illustrates a portion of the power control feature of the group control software for energy storage devices providing the method of control for deploying the distributed energy storage devices in various end-use applications within the group control framework;

FIG. 4B further illustrates the power control feature of the group control software for energy storage devices providing the method of control for deploying the distributed energy storage devices in various end-use applications within the group control framework;

FIG. 4C further illustrates the power control feature of the group control software for energy storage devices providing the method of control for deploying the distributed energy storage devices in various end-use applications within the group control framework;

FIG. 5 illustrates one embodiment of the login feature which is the page users reach when first logging into the browser-based portal;

FIG. 6 illustrates one embodiment of the landing feature which is the page that users reach after login to the browser-based portal, including a list of distributed energy storage system devices in the left hand panel;

Figures 7, 8:
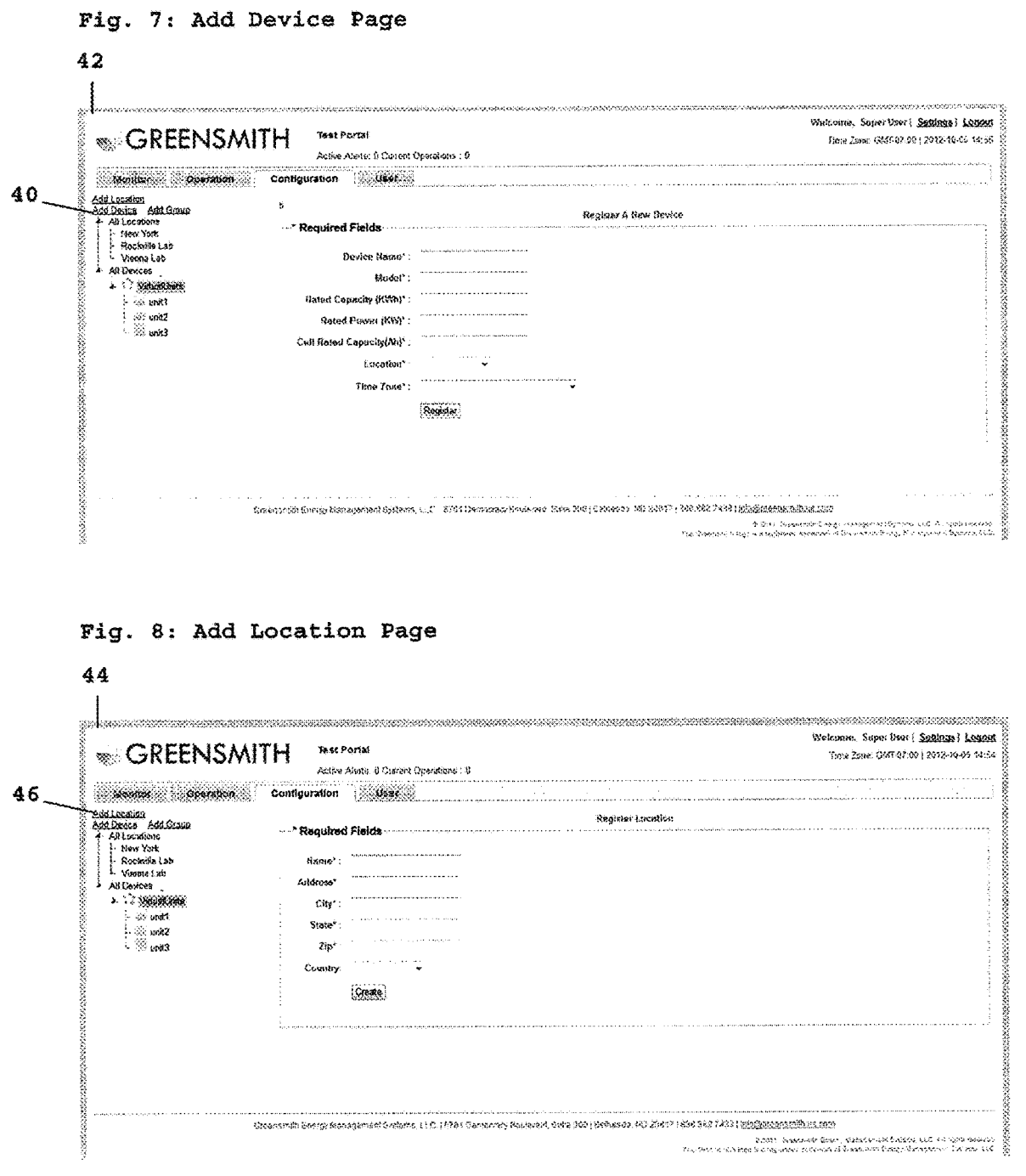

FIG. 7 illustrates one embodiment of the add device feature which users reach after pressing the "add device" button which enables users to register new devices to their account;

FIG. 8 illustrates one embodiment of the add location feature which users reach after pressing the "add location" button, enabling users to register a new location for groups or devices;

Figures 9, 10:
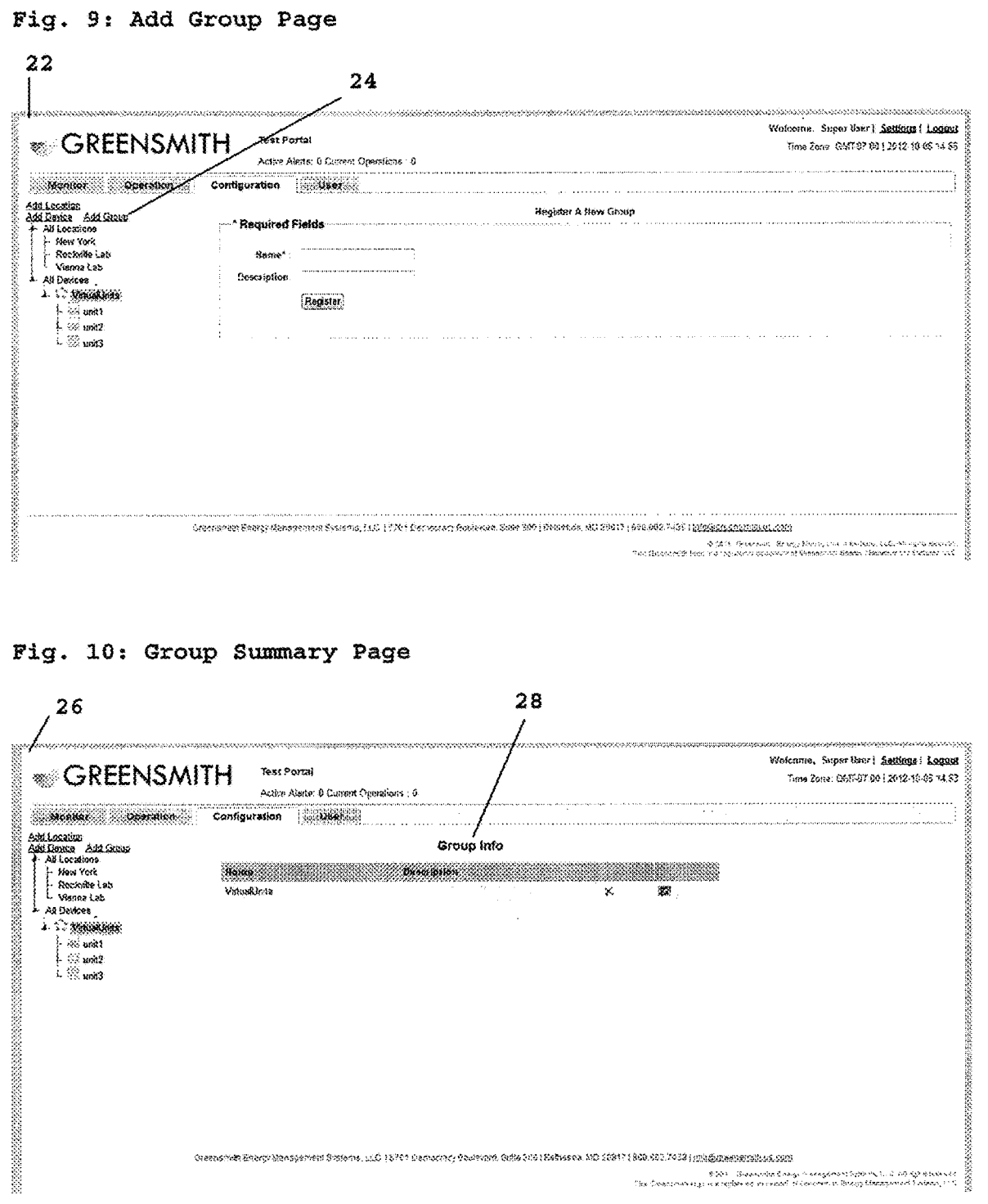

FIG. 9 illustrates one embodiment of the add group feature which users reach after pressing the "add group" button, enabling users to register new groups to their account;

FIG. 10 illustrates one embodiment of the group summary feature which enables users to view all of the devices listed under a registered group;

Figures 11, 12:
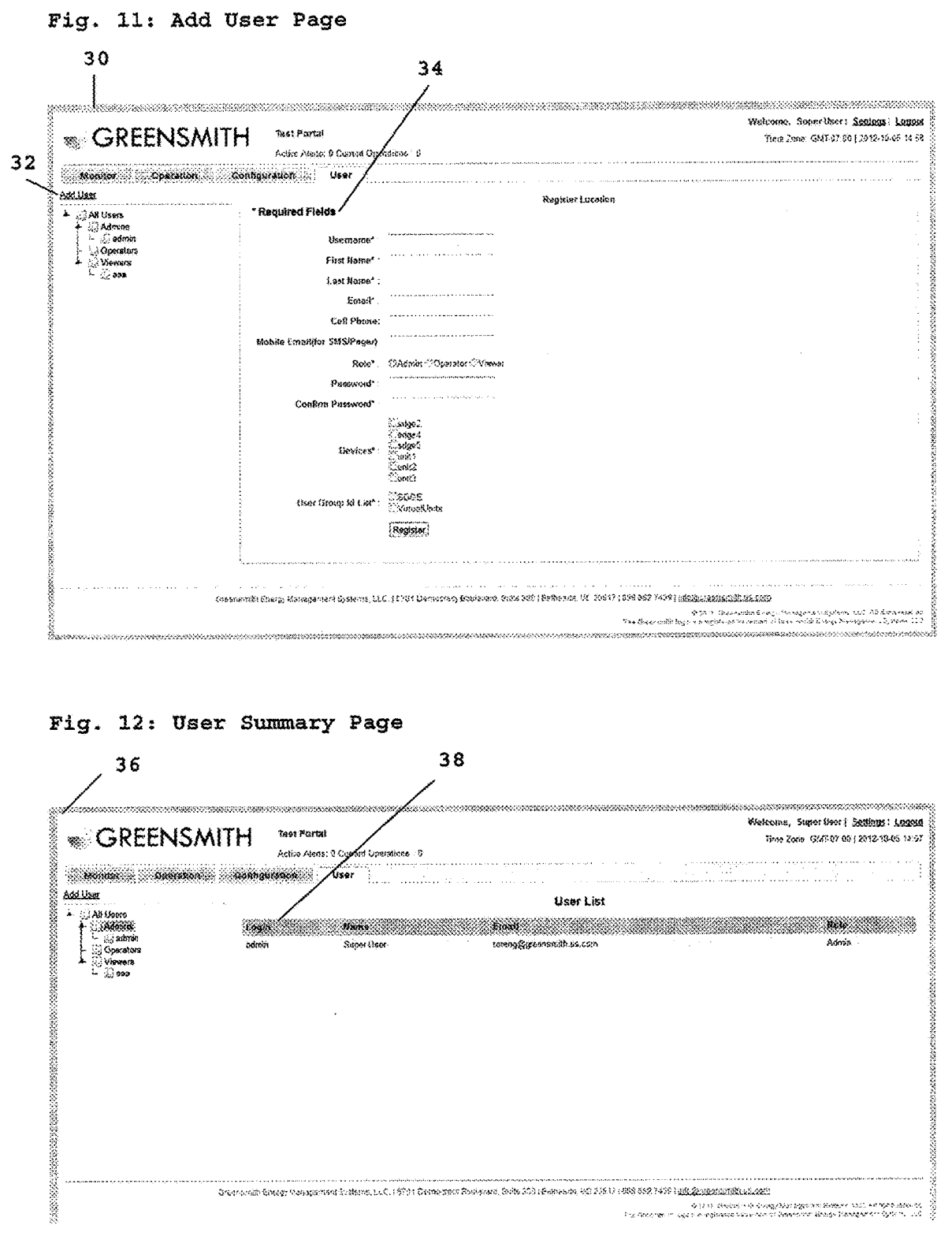

FIG. 11 illustrates the add user feature which users reach after pressing the "add user" button, enabling users to register a new user to an account;

FIG. 12 illustrates the user summary feature which enables a master user to view all of the users listed under an account;

FIG. 13 illustrates one embodiment of the group monitor dashboard showing the map and battery health monitors that users see on their browser-based portal dashboard;

FIG. 14 illustrates one embodiment of the group monitor chart showing the history of metrics tracked at the group level, including AC real power, AC reactive power, load power, and energy available;

FIG. 15 illustrates device level monitoring charts showing the various metrics which are monitored and charted in the device and cell-level monitoring web pages of the browser-based portal;

FIG. 16 illustrates one embodiment of the download page feature which shows the user steps to download historical data;

FIG. 17 illustrates one embodiment of the AC meter monitoring chart feature which shows the metrics that are monitored and charted with respect to the AC meters;

FIG. 18 illustrates the group operation landing page feature, enabling users to schedule in various group control events;

Figure 19:
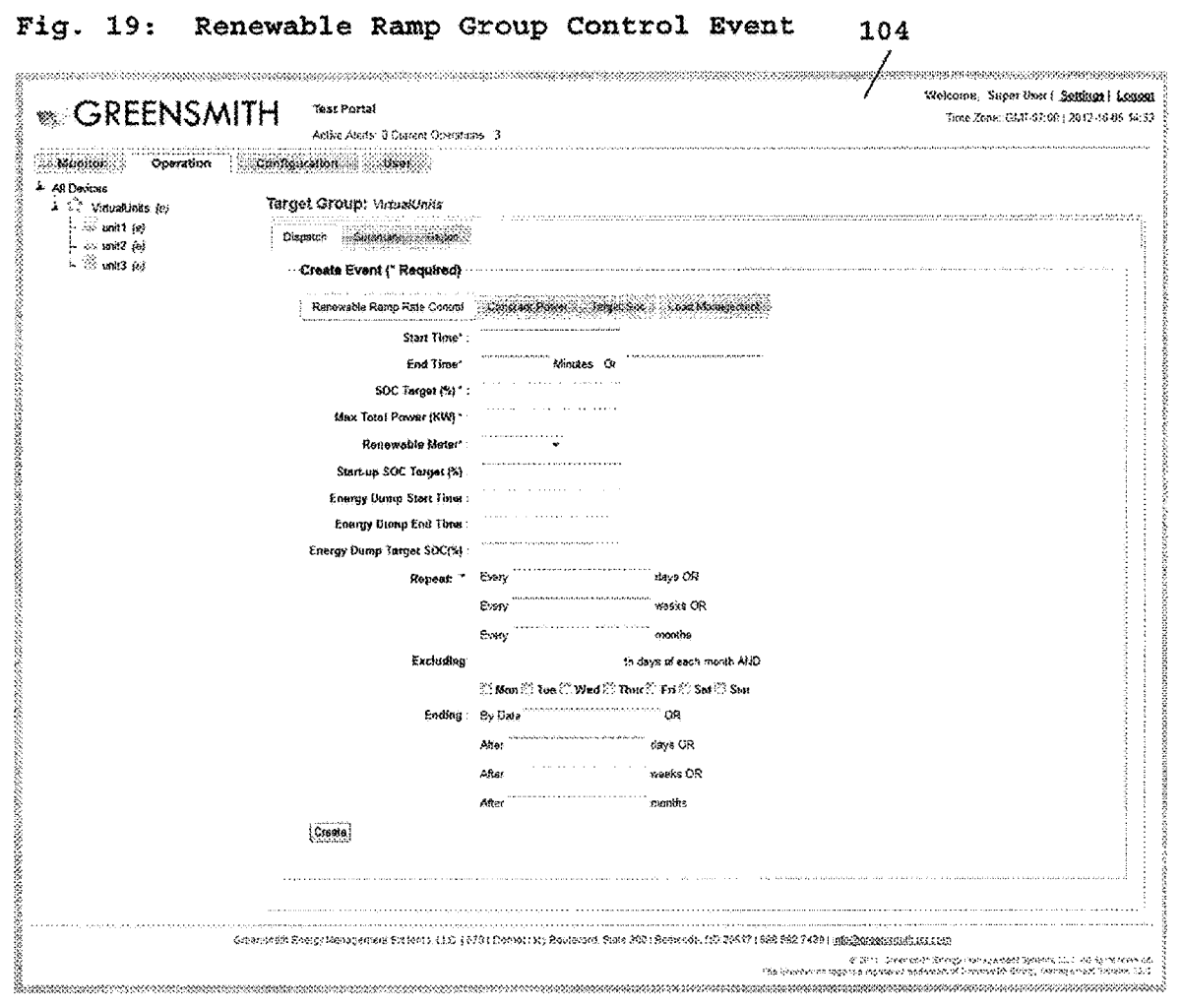

FIG. 19 illustrates the renewable ramp group control event feature, enabling users to schedule group control parameters for a renewable ramp event;

FIG. 20 illustrates one embodiment of the constant power group control event which enables users to schedule group control parameters for a constant power charge or discharge event;

FIG. 21 illustrates one embodiment of the target state of charge group control event feature which enables users to schedule group control parameters for a target state of charge;

FIG. 22 illustrates one embodiment of the load management group control event feature which enables users to schedule group control parameters for a load management event;

Figure 23:
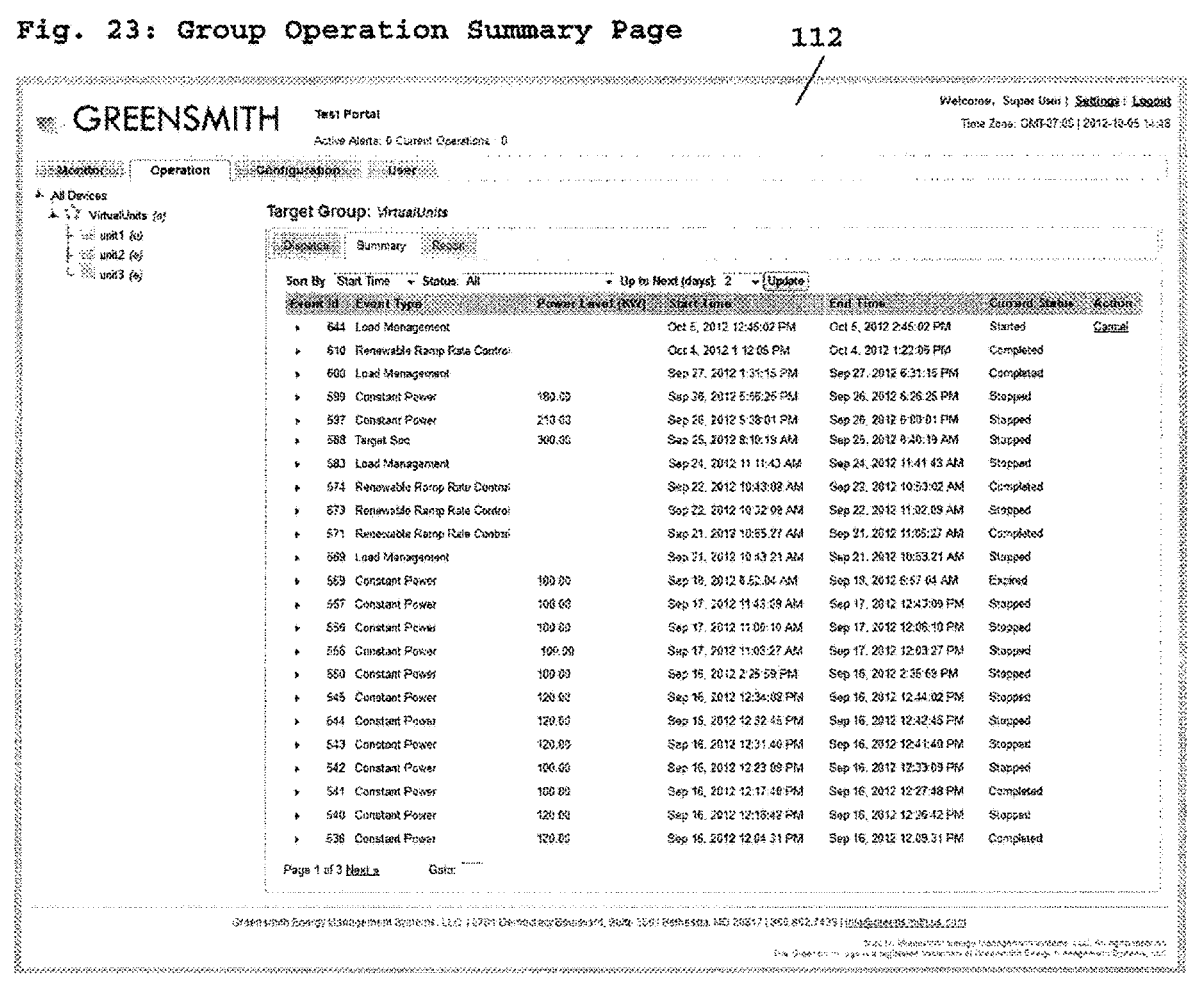

FIG. 23 illustrates one embodiment of the group operation summary feature that provides the complete list of all previous and scheduled group operation events;

FIG. 24 illustrates one embodiment of the group operation report page which provides an overview of energy charged and discharged at the group level during various periods;

Figure 25:
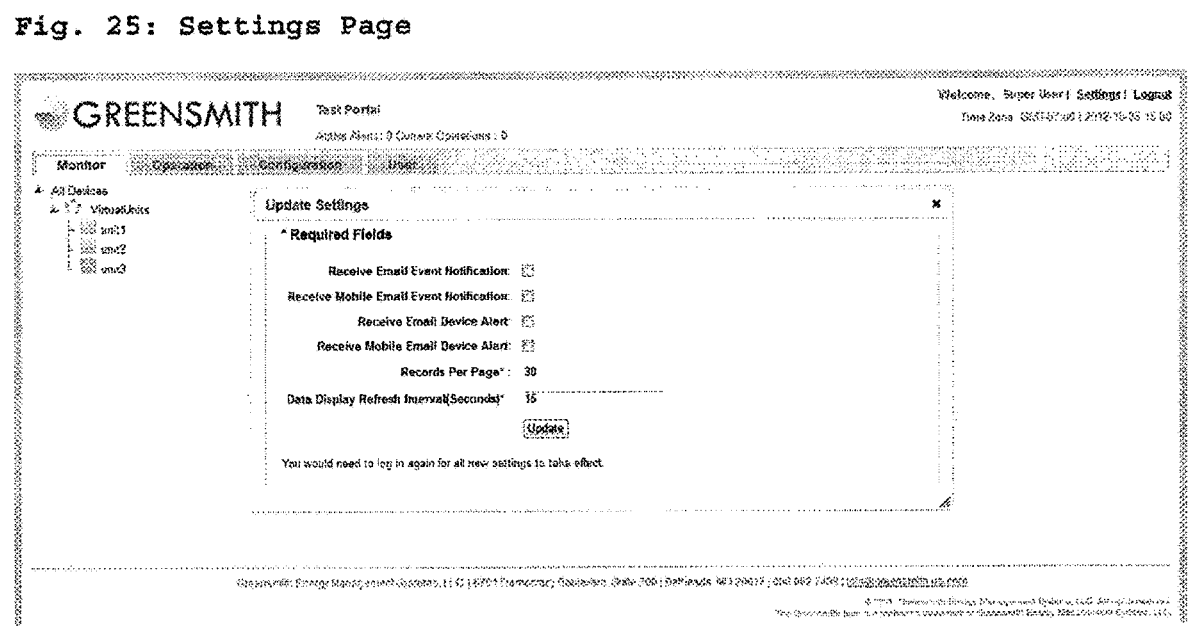

FIG. 25 illustrates one embodiment of the settings page feature which enables users to configure their settings, such as but not limited to email address and password; and FIG. 26 illustrates one embodiment of the master/slave system.

DETAILED DESCRIPTION OF THE INVENTION

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. For the sake of brevity, conventional techniques related to computing methods, programming, and data processing, and other functional aspects of the systems (and the individual operating components of the systems) may not be described in detail herein. It should be noted that many alternative or additional functional relationships may be present in an embodiment of the subject matter. Further, when a technique or technology is described herein, it is submitted that it is within the knowledge of one skilled in the art to utilize such technique or technology whether or not explicitly described. In particular, the method described here includes details about the algorithms and processes used to create specific software and/or software features, such that a person skilled in the art of computer science, electrical engineering, and/or programming languages will be able to re-create such software and/or software features.

Referring generally to FIGS. 1-26, a system and method for creating software for controlling a network of distributed energy storage devices 100 is illustrated. In a preferred embodiment, these networked distributed energy storage devices 100 are architected in a master/slave system, with redundant master units. Each of the aforementioned distributed energy storage devices 100 contain computing components 10 providing local monitoring and controls, as well as an internet-connected controller 12, which may be wired or wireless, relaying information to and from the distributed energy storage device, including but not limited to AC meter information, renewable generation information, temperature, voltage, state of charge estimations, and both real and reactive power information. The internet connected controllers are connected to a centralized server 14 to store and process commands. In one embodiment this server might be privately owned by a customer, and in another embodiment it might be privately purchased server space in a third-party server farm. The described distributed energy storage devices 100 include those with an architecture outlined in U.S. patent application Ser. No. 13/127,967, "Distributed Energy Storage System, and Applications Thereof."

Referring to FIG. 1, the group control software, as shown in the overall process chart 16 illustrates the formation and maintenance of groups of energy storage devices 100. The software enables users to define and control a plurality of energy storage devices 100 in user-defined groups 18, through internet-based protocols and/or an online user interface. Furthermore, the group control software provides methods of maintaining these user-defined groups 20, and methods of carrying out pre-scheduled and real-time control of these user-defined groups 22, such that the groups of distributed energy storage units have centralized methods of user-controlled dispatch for both charge and discharge of real and reactive power.

In at least one embodiment, the present invention enables aggregation of a plurality of distributed energy storage devices 100 such that the networked group of devices will behave in unison as one very large virtual bulk energy storage unit.

As shown in FIG. 1, the Overall Process chart describes the overall group control methodology. To begin the group control process, the software must provide the ability to Define Groups 18. In an embodiment, this includes creation of user-defined groups, locations, and all relevant associated user permissions for such user-defined groups. In one embodiment, screenshots of such a Graphical User Interface to create and view groups and add users, and edit and view permissions is illustrated in FIGS. 9-12. In particular, FIG. 9 illustrates one embodiment of the add group page 22 feature which users reach after pressing the "add group" button 24, enabling users to register new groups to their account. FIG. 10 illustrates the group summary feature page 26 that enables users to view all of the devices listed under a registered group 28. FIG. 11 illustrates the add user feature page 30 which users reach after pressing the "add user" button 32, enabling users to register a new user to an account upon filling in the required fields 34.

FIG. 12 illustrates the user summary page 36 feature which enables a master user to view all of the users listed under an account 38.

Still referring to FIG. 1 and the Overall Process chart 16, the user is provided with the ability to perform group assignment of distributed devices to the user-defined groups. To accomplish this task, the software provides "drag and drop" assignment, as well as assignment during group creation. In at least one embodiment, the software may also enable the ability to add new devices to a user account; FIG. 7 and FIG. 8 illustrate screenshots of such a Graphical User Interface to add new devices and define locations. FIG. 7 illustrates the add device feature page 42 which users reach after pressing the "add device" button 40 which enables users to register new devices to their account. FIG. 8 illustrates the add location feature page 44 which users reach after pressing the "add location" button 46, enabling users to register a new location for groups or devices.

Still referring to FIG. 1 and the overall process chart 16, the software provides device-level configuration of scheduling as devices read schedules from group-level calendars of events. In one embodiment the schedule shall be downloaded from central servers and stored on local memory within the distributed energy storage device 100. In an alternative embodiment, the group control system relays secured configuration messages containing scheduling instructions from the central server to devices, and confirmation messages in return. This process is further described in Group Configuration and Schedule Download.

Still referring to FIG. 1 and the Overall Process chart 16, the software of the present invention will also enable real-time control of the distributed energy storage devices 100 through frequent, periodic messaging between the central server 14 and distributed energy storage devices 100, through the Group Maintenance process 20. The software of the present invention enables users to schedule various Group Power Control functions, or in an embodiment, take real-time control of user-defined groups for Group Power Control functionality. At 50 of the overall process chart, (FIG. 1), the software enables methods of ending groups control events. In an embodiment, events may be stopped directly by user, by interruption, or as scheduled.

Referring to FIG. 2, the group control framework feature 52 includes detailed rules for managing devices under the overall process shown in FIG. 1. In particular, the group control framework feature 52 includes detailed rules about managing group configuration messages 54, and group schedules 56, including rules around creation and deletion of events and devices 58. Embodiments of the software framework feature 52 may also include the following: Group Presentation 60 through usage of a device tree, as well as detailed rules for managing devices under various parameters under Group Event Execution 58.

Referring to FIGS. 3A and 3B, the software provides a method of group maintenance throughout system starts and re-starts through the master election algorithm 62 which provides the detailed steps of Start State 64, Group Formation 66, and Group Maintenance 68, including details of timing and the acknowledgement of group ownership messages.

Referring to FIGS. 4A-4C, the power control feature 70 is illustrated. The power control feature 70 provides the details of controlling the user-defined groups for various power applications, including but not limited to constant power 72, and target state of charge 74. Other dynamic applications such as renewable or load following can also be monitored according to the signal provided by the instrument. The software includes power control signal 76 messages to and from the devices, power level determination 78 across the group of devices. The software is also constructed and arranged for handling messages across Web group event handling dispatch, via either internet graphical user interface, or another set of internet protocols, including but not limited to Modbus or DNP3. In at least one embodiment, these events will also send messages back to the central server through master distributed devices.

FIGS. 5-25 provide images of one embodiment of the present invention, particularly the group control software, which exists as an internet-based program users may access through any computer or internet browser, including for example on a mobile device. These images demonstrate one embodiment of the Graphical User Interface (GUI) for human-machine-interaction (HMI). However, the present invention also includes various protocols for machine-to-machine integration, including but not limited to Modbus and DNP3 internet-based protocols.

As shown in FIG. 5, the login page 80 is illustrated. The login page creates a method of user authentication upon logging into the internet based software, and provides a method of viewing groups and devices on the landing page 82, as shown in FIG. 6. As mentioned above and as described in FIG. 2 for the group framework feature 52, the browser-based software depicts the devices listed under each group as a device tree. Note that authentication and device presentation may take different formats, especially in the embodiment using internet-based protocols such as Modbus or DNP3.

As shown in FIG. 7-9 and FIG. 11, the software creates an interface for adding new devices 42, location 44, groups 22, and users 30. Summaries of users and groups are illustrated on the group summary page 26 as shown in FIG. 10. Note that adding new devices, groups, locations, and users may take different formats, especially in the embodiment using internet-based protocols such as Modbus or DNP3.

As shown in FIGS. 13-15, the software creates a graphical user interface. FIG. 13 represents the group monitor dashboard 84 which may create monitors, charts, and dashboards readable on the group monitor chart 86 to track metrics such as, but not limited to, location, energy available, AC meter information, renewable generation information, temperature, voltage, state of charge estimations, and both real and reactive power information. Note that these charts track metrics at the device-level, as seen on the device level monitoring chart 88 (FIG. 15), however reporting at the group-level as seen in FIG. 13 and FIG. 14 aggregates device-level information and provides metrics at the group-level. The formats of these summary and dashboard charts do not carry over to the embodiment using internet-based protocols such as Modbus or DNP3; however, using those internet-based protocols, a wide variety of alternative reports could be created.

As shown in FIG. 16, the software download page 90 feature enables download of historical data 92 for export into other formats. This command is also included in the embodiment using internet-based protocols such as Modbus or DNP3.

As shown in FIG. 17, the software provides AC meter monitoring 94 through the AC metering chart 96.

As shown in FIGS. 18-22, the software provides group power control 102 through operational commands in the group operation landing page 98 in the embodiment with a graphical user interface, and in the embodiment using internet-based protocols such as Modbus or DNP3. These group power controls include but are not limited to: renewable ramp rate 104, group control 102, constant power group control 106, target state of charge group control 108, and load management group control 110. As described earlier, the process of acting upon each of these group control commands is included in the FIG. 4 flowchart, Power Control.

Referring to FIGS. 23-24, the software architect provides a group operation summary function page 112 and group operation report page 114 showing the list of executed commands/operations (FIG. 23), and the summary of energy transfer during these commands (FIG. 24). The formats of these summary and report pages do not carry over to the embodiment using internet-based protocols such as Modbus or DNP3, however, using those internet-based protocols, a wide variety of alternative reports could be created.

In both the embodiment with a graphical user interface as seen in FIG. 25, and in the embodiment using internet-based protocols such as Modbus or DNP3, the software provides commands for users to configure their settings for authentication, such as email addresses and passwords.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A distributed energy storage system, comprising:
a plurality of distributed energy storage devices, where each of said plurality of distributed energy storage devices is provided with a computer, each said computer being configured and arranged to provide local monitoring and control of one of said plurality of distributed energy storage devices, each said computer including an internet connected controller;
a centralized server including an internet connected controller, said centralized server being configured for internet communication with each of said computers being configured for monitoring a respective energy storage device, wherein said centralized server is configured to collect and store data from each of said plurality of energy storage devices collected by each said respective computer, and analyze said data to determine energy available at each of said plurality of energy storage devices;
wherein each said respective computer is configured to connect with said centralized server using a master/slave internet protocol network, and a group control software installed into each said respective computer and said centralized server, said group control software being configured to:
establish said server as master in said master/slave internet protocol network over said plurality of distributed energy storage device computers, whereby said server will provide commands to said computers regarding storage and release of electrical power; and
define and control said plurality of energy storage devices in distinctive user-defined groups, such that each of said user-defined groups of said plurality of distributed energy storage devices have said centralized server for controlling both charge and discharge of power flowing to and from each said respective distributed energy storage device.

2. The distributed energy storage system of claim 1, wherein said centralized server is configured to determine an aggregation of said energy storage devices needed to alter the load demand of a power network.

3. The distributed energy storage system of claim 1, wherein said centralized server is configured to determine an aggregation of said energy storage devices that behave in unison as one virtual bulk energy storage unit.

4. The distributed energy storage system of claim 3, wherein said group control software is configured to form said user-defined group including said plurality of distributed energy storage devices.

5. The distributed energy storage system of claim 1, wherein said group control software is configured to establish user permissions for each group of said energy storage devices through said centralized server.

6. The distributed energy storage system of claim 5, wherein said group control software is configured to provide device-level configuration of schedules defining operation and function of devices and systems within each respective distributed energy storage device.

7. The distributed energy storage system of claim 6, wherein said schedules are downloaded from said centralized server and stored on a local memory within each said respective distributed energy storage device.

8. The distributed energy storage system of claim 6, wherein said server is part of a respective distributed energy storage device.

9. The distributed energy storage system of claim 1, wherein said group control software is configured to provide real-time control of each said respective distributed energy storage device through frequent, periodic messaging between said centralized server and each said respective distributed energy storage device.

10. The distributed energy storage system of claim 1, wherein said group control software is configured to require each respective distributed energy storage device to power up as an independent device and master of its own group.

11. The distributed energy storage system of claim 10, wherein said group control software is configured to send out a signal requesting other independent devices that are master of their own group to join together into a larger group, an algorithm on the system determining which added independent group will be master of the other independent groups.

12. The distributed energy storage system of claim 11, wherein algorithm utilizes a user assigned number to each said respective distributed energy storage device, said user assigned number being utilized by said algorithm to determine which added independent group will be master.

13. The distributed energy storage system of claim 1, wherein a power level distribution algorithm within said server is provided for monitoring the capabilities and state of charge of each said respective distributed energy storage device, whereby said server is configured to utilize said capabilities and state of charge in combination with said algorithm to control the flow of power into and out of each said distributed energy storage device.

14. The distributed energy storage system of claim 13, wherein said algorithm is configured to route unutilized power to units with capacity to store said power.

15. The distributed energy storage system of claim 10, wherein said group control software is configured to depict each respective distributed energy storage device listed under each group as part of a device tree displayable upon a graphical user interface.

16. The distributed energy storage system of claim 10, wherein said group control software is configured to create a graphical user interface containing one or more of monitors, charts, and dashboards to track metrics regarding at least one of: location, energy available, AC meter information, renewable generation information, temperature, voltage, state of charge estimations, and power information.

17. The distributed energy storage system of claim 10, wherein said group control software is configured to be operable from a mobile device.

18. A distributed energy storage device, comprising:
a computer;
an internet-connected controller for connecting to a centralized server; and
a renewable energy source, wherein said computer is configured and arranged to provide local monitoring and control of said distributed energy storage device, and configured to send data from said distributed energy storage device collected by said computer to said server for analysing said data to determine energy available at said energy storage device, wherein said computer is configured to connect with said centralized server using a master/slave internet protocol network, and a group control software installed into said computer and said centralized server, and said group control software is configured to:
establish said server as master in said master/slave internet protocol network over said distributed energy storage device computer, whereby said server will provide commands to said computer regarding storage and release of electrical power; and
define and control said energy storage device in distinctive user-defined groups, such that each of said user-defined groups have said centralized server for controlling both charge and discharge of power flowing to and from said respective distributed energy storage device.

19. The distributed energy storage device of claim 18, wherein said renewable energy source comprises:
at least one of the following: solar energy source; and wind energy source.

20. A centralized server comprising:
an internet connected controller, said centralized server being configured for internet communication with computers monitoring an energy storage device of a plurality of distributed energy storage devices, each of said plurality of distributed energy storage devices being provided with a computer, each said computer being configured and arranged to provide local monitoring and control of one of said plurality of distributed energy storage devices, each said computer including an internet connected controller, wherein said centralized server is configured to collect and store data from each of said plurality of energy storage devices collected by each said respective computer, and analyze said data to determine energy available at each of said plurality of energy storage devices;
wherein each said respective computer is configured to connect with said centralized server using a master/slave internet protocol network, and a group control software installed into each said respective computer and said centralized server, and said group control software is configured to:
establish said server as master in said master/slave internet protocol network over said plurality of distributed energy storage device computers, whereby said server will provide commands to said computers regarding storage and release of electrical power; and
define and control said plurality of energy storage devices in distinctive user-defined groups, such that each of said user-defined groups of said plurality of distributed energy storage devices have said centralized server for controlling both charge and discharge of power flowing to and from each said respective distributed energy storage device.

* * * * *